United States Patent
Monteuuis et al.

(10) Patent No.: US 12,393,483 B2
(45) Date of Patent: Aug. 19, 2025

(54) CROSS-TYPE MISBEHAVIOR DETECTION IN A VEHICLE-TO-EVERYTHING (V2X) MESSAGE

(71) Applicant: QUALCOMM Incorporated, San Diego, CA (US)

(72) Inventors: Jean-Philippe Monteuuis, Northborough, MA (US); Jonathan Petit, Wenham, MA (US); Mohammad Raashid Ansari, Lowell, MA (US); Cong Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 223 days.

(21) Appl. No.: 17/812,749

(22) Filed: Jul. 15, 2022

(65) Prior Publication Data

US 2024/0020192 A1    Jan. 18, 2024

(51) Int. Cl.
*G06F 11/07* (2006.01)
*H04W 4/40* (2018.01)

(52) U.S. Cl.
CPC ...... *G06F 11/0793* (2013.01); *G06F 11/0739* (2013.01); *G06F 11/0784* (2013.01); *H04W 4/40* (2018.02)

(58) Field of Classification Search
CPC ............. G06F 11/0793; G06F 11/0739; G06F 11/0784; H04W 4/40; H04W 12/122; G08G 1/163; G08G 1/0112; G08G 1/012; H04L 63/1408
See application file for complete search history.

(56) References Cited

U.S. PATENT DOCUMENTS

| | | | |
|---|---|---|---|
| 11,076,262 B2 | 7/2021 | Vanderveen et al. | |
| 12,126,993 B2* | 10/2024 | Whyte | H04W 4/38 |
| 2016/0140842 A1* | 5/2016 | Park | G08G 1/0112 |
| | | | 340/905 |
| 2020/0045517 A1* | 2/2020 | Park | H04W 4/12 |
| 2020/0139980 A1 | 5/2020 | Liu et al. | |

(Continued)

OTHER PUBLICATIONS

ETSI TS 103 759, "Intelligent Transport System (ITS); Security; Misbehaviour Reporting Service Release 2", TSI Draft Specification, 103 759, European Telecommunications Stands Institute (ETSI), 650, Route Des Lucioles, F-06921 Sophia-Antipolis, France No. V0.0.5, Oct. 26, 2021, XP014411165, pp. 1-41 (Year: 2021).*

(Continued)

*Primary Examiner* — Khoi H Tran
*Assistant Examiner* — Nhi Q Bui
(74) *Attorney, Agent, or Firm* — Muncy, Geissler, Olds & 1Lowe, P.C.

(57) ABSTRACT

Various embodiments include methods and systems for performing misbehavior detection in a vehicle-to-everything (V2X) message. Various embodiments may include a V2X system of a vehicle comparing a first field in a first V2X message of a first V2X message type to a second field in a second V2X message of a second V2X message type, wherein the second V2X message type is different from the first V2X message type, identifying misbehavior in either the first V2X message or the second V2X message based on the comparison, and taking an action in response to identifying misbehavior in the first V2X message or the second V2X message.

26 Claims, 11 Drawing Sheets

(56) References Cited

U.S. PATENT DOCUMENTS

2021/0084461 A1* 3/2021 Kim .................... H04W 4/40
2021/0314748 A1* 10/2021 Cominetti ............ H04W 12/069
2022/0095115 A1* 3/2022 Shimizu .............. H04W 12/104
2022/0246031 A1* 8/2022 Vijaya Kumar ............................
G08G 1/096741

OTHER PUBLICATIONS

ETSI TS 103 759: "Intelligent Transport Systems (ITS); Security; Misbehaviour Reporting Service Release 2", ETSI Draft Specification, 103 759, European Telecommunications Standards Institute (ETSI), 650, Route Des Lucioles, F-06921 Sophia-Antipolis, France No. V0.0.5, Oct. 26, 2021, XP014411165, pp. 1-41, p. 23-p. 28.
International Search Report and Written Opinion—PCT/US2023/023310—ISA/EPO—Sep. 13, 2023. 13 pages.

* cited by examiner

CROSS-TYPE MISBEHAVIOR DETECTION IN A VEHICLE-TO-EVERYTHING (V2X) MESSAGE

BACKGROUND

Vehicle-to-Everything (V2X) systems support vehicle-to-vehicle and vehicle-to-highway system communications according to communication protocols and messaging formats defined under a relevant standard, such as Cellular Vehicle-to-Everything (C-V2X), Dedicated Short Range Communication (DSRC), and ITS-G5. These standards serve as the foundation for vehicle-based wireless communications, and may be used to support intelligent highways, autonomous and semi-autonomous vehicles, and improve the overall efficiency and safety of the highway transportation systems.

An element of V2X processing systems is the ability for a vehicle to broadcast V2X messages that other vehicles can receive and process to improve traffic safety, such as to perform safe path planning, to avoid collisions, and the like. V2X messages may be of a variety of message types, such as Basic Safety Messages (BSM), Cooperative Awareness Messages (CAM), Collective Perception Messages (CPM), Maneuver Sharing Coordinating Messages (MSCM), and the like. Various V2X message types may include information that is similar or analogous, but the information may be arranged or formatted differently according to the message type.

SUMMARY

Various aspects include methods that may be performed by a vehicle-to-everything (V2X) vehicle processing system for misbehavior detection in a V2X message. Various aspects may include comparing a first field in a first V2X message of a first V2X message type to a second field in a second V2X message of a second V2X message type, wherein the second V2X message type is different from the first V2X message type, identifying misbehavior in either the first V2X message or the second V2X message based on the comparison, and taking an action in response to identifying misbehavior in the first V2X message or the second V2X message.

Some aspects may include selecting the first field in the first V2X message and the second field in the second V2X message by identifying a field in the first V2X message and a field in the second V2X message that include analogous information. In some aspects, identifying misbehavior in either the first V2X message or the second V2X message based on the comparison may include identifying misbehavior in either the first V2X message or the second V2X message when information in the first field is inconsistent with information in the second field.

In some aspects, comparing the first field in the first V2X message of the first V2X message type to the second field in the second V2X message of the second V2X message type may include selecting a first detector based on the first V2X message type and a second detector based on the second V2X message type, and comparing the first field in the first V2X message of the first V2X message type to the second field in the second V2X message of the second V2X message type using the selected first and second detectors. In some aspects, comparing the first field in the first V2X message of the first V2X message type to the second field in the second V2X message of the second V2X message type using the selected first and second detectors may include comparing a result of applying the first detector to information in the first V2X message to a result of applying the second detector to information in the second V2X message.

Some aspects may include comprising comparing a time value and a location value associated with the first field in the first V2X message of the first V2X message type and the second field in the second V2X message, wherein taking an action in response to identifying misbehavior in the first V2X message or the second V2X message may include taking an action in response to identifying misbehavior in the first V2X message or the second V2X message when time and location values associated with the first field in the first V2X message of the first V2X message type and the second field in the second V2X message are substantially the same. In some aspects, taking an action in response to identifying misbehavior in the first V2X message or the second V2X message may include generating a correction for information in the first field or the second field when one of the time and location values associated with the first field in the first V2X message of the first V2X message type and the second field in the second V2X message are not substantially the same. In some aspects, taking an action in response to identifying misbehavior in either the first V2X message or the second V2X message may include transmitting a misbehavior report indicating the identified misbehavior to a network computing device.

Further aspects include a vehicle processing system including a memory and a processor configured to perform operations of any of the methods summarized above. Further aspects may include a vehicle processing system having various means for performing functions corresponding to any of the methods summarized above. Further aspects may include a non-transitory processor-readable storage medium having stored thereon processor-executable instructions configured to cause a processor of a vehicle processing system to perform various operations corresponding to any of the methods summarized above.

BRIEF DESCRIPTION OF THE DRAWINGS

The accompanying drawings, which are incorporated herein and constitute part of this specification, illustrate exemplary embodiments of the claims, and together with the general description given and the detailed description, serve to explain the features herein.

DETAILED DESCRIPTION

Figure 1A:
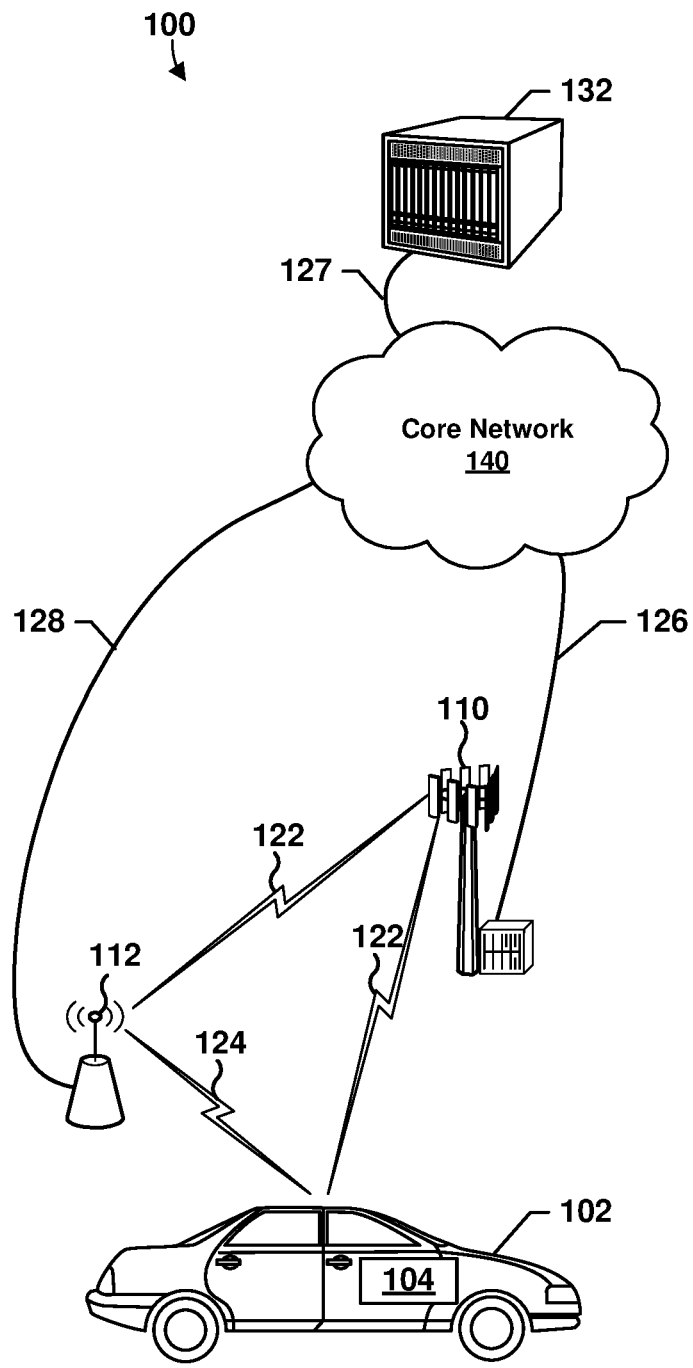
FIG. 1A is a system block diagram illustrating an example communication system suitable for implementing various embodiments.

Various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

Various embodiments include methods, and V2X processing systems and network computing device processing systems implementing the methods, for detecting misbehavior conditions in V2X messages. In various embodiments, a V2X processing system may include one or more processors and/or other components configured to perform various operations for misbehavior detection in V2X messages. In various embodiments, a V2X processing system of a vehicle may compare a first field in a first V2X message of a first V2X message type to a second field in a second V2X message of a second V2X message type, in which the first V2X message type and the second V2X message type are different. Based on this comparison, the V2X processing system may identify misbehavior in either the first V2X message or the second V2X message. In response to identifying misbehavior in either the first or second V2X messages, the V2X processing system may take an action, such as send a misbehavior report.

As used herein, the term "vehicle" refers generally to any of an automobile, motorcycle, truck, bus, train, boat, and any other type of vehicle V2X-capable system that may be configured to manage transmission of misbehavior reports.

The term "system on chip" (SOC) is used herein to refer to a single integrated circuit (IC) chip that contains multiple resources and/or processors integrated on a single substrate. A single SOC may contain circuitry for digital, analog, mixed-signal, and radio-frequency functions. A single SOC may also include any number of general purpose and/or specialized processors (digital signal processors, modem processors, video processors, etc.), memory blocks (e.g., ROM, RAM, Flash, etc.), and resources (e.g., timers, voltage regulators, oscillators, etc.). SOCs may also include software for controlling the integrated resources and processors, as well as for controlling peripheral devices.

The term "system in a package" (SIP) may be used herein to refer to a single module or package that contains multiple resources, computational units, cores and/or processors on two or more IC chips, substrates, or SOCs. For example, a SIP may include a single substrate on which multiple IC chips or semiconductor dies are stacked in a vertical configuration. Similarly, the SIP may include one or more multi-chip modules on which multiple ICs or semiconductor dies are packaged into a unifying substrate. A SIP may also include multiple independent SOCs coupled together via high speed communication circuitry and packaged in close proximity, such as on a single motherboard or in a single wireless device. The proximity of the SOCs facilitates high speed communications and the sharing of memory and resources.

In V2X communications, V2X processing systems in vehicles may be configured to send and receive V2X messages that vehicles can receive and process to improve traffic safety, such as to perform safe path planning, to avoid collisions, and the like. V2X messages may be of a variety of message types, such as Basic Safety Messages (BSM), Cooperative Awareness Messages (CAM), Collective Perception Messages (CPM), Maneuver Coordination Messages (MCM) such as Maneuver Sharing Coordinating Messages (MSCM), Signal Phase and Timing (SPAT) messages, Signal Phase and Timing Extended Messages (SPATEM), Map messages with road lane and topology information (MAP messages), MAP extended messages (MAPEM), Signal Request Messages (SRM), and other similar V2X messages. Various V2X message types may include information that is similar or analogous, but the information may be arranged or formatted differently according to the message type. For example, a BSM and an MCM may each include information about the dimensions of a vehicle, a vehicle trajectory, a planned vehicle path, or other suitable information, arranged and/or formatted according to differences in the message types. Similar or analogous information in different V2X message types should be consistent. For example, information about the dimensions of a vehicle, vehicle trajectory, planned path, and other vehicle information should be the same in V2X messages of different message types. Current V2X processing systems may be configured to detect inaccurate or intentionally false information in a BSM or CAM received from another vehicle or from Intelligent Transportation System (ITS) infrastructure devices, such as Roadside Units (RSUs). Misbehaviors detected in such messages may be communicated to other vehicles and network systems in misbehavior reporting messages (MBR).

However, misbehavior detections methods implemented in current V2X processing systems are unable to detect inconsistent information in V2X messages of different message types (sometimes referred to as cross-type misbehavior detection). Inconsistencies among similar or analogous information in different V2X message types may indicate V2X misbehavior. For example, information in a CPM may indicate an occupied space (i.e., a road portion or area with a vehicle in it), and a BSM with information indicating a location of a vehicle that is in the occupied space would be consistent with the information in the CPM. However, a BSM with information that indicates that a vehicle is located in a particular space (i.e., a road portion or area without vehicles in it) would be inconsistent with information in a CPM that indicates that space is unoccupied or free. This inconsistency in information in the BSM and the CPM may indicate V2X misbehavior. As another example, vehicle dimension information contained in a BSM and in an MCM should be consistent, because dimension information contained in a BSM that is inconsistent with information in an MCM may indicate potential V2X misbehavior. As another example, a vehicle's MCM indicating an intended maneuver should have maneuver information and information about local road conditions that is consistent with information about local road conditions in BSMs from the vehicle and/or nearby vehicles.

Inconsistencies among similar or analogous information in different V2X message types (i.e., V2X misbehavior) may lead to degradation of performance or deactivation of one or more vehicle V2X processing systems, and may have a larger effect on numerous vehicles in an area or on the V2X network itself, such as potentially lowering the available level of automation for autonomous or semiautonomous vehicles in an area (e.g., Level 3 (conditional automation), Level 4 (high automation), or Level 5 (full automation) of driving automation as defined by the Society of Automotive Engineers). Inconsistencies among V2X messages also may decrease safety overall in the traffic network.

Current V2X processing systems are typically not configured to detect V2X misbehavior in V2X messages of different message types. For example, current V2X processing systems do not store previously-received or historical V2X messages, rendering current V2X processing systems unable to perform cross-type misbehavior detection. Previously received V2X messages that have been analyzed and authenticated or found to be "non-misbehavior" may provide valuable information to for identifying an inconsistency in a newly received V2X message. Further, current V2X processing systems do not store digital signatures of historical V2X messages, but rather typically remove security header of a V2X message once the message is properly verified. The absence of V2X message security header prevents a V2X processing system or a Misbehavior Authority in the V2X network from ensuring the authenticity of past V2X messages.

Various embodiments include methods implemented in vehicle processing systems for detecting misbehavior in V2X messages by analyzing and comparing two or more V2X messages of different message types. A V2X processing system may compare analogous or similar information in a first V2X message and a second V2X message, each V2X message being of different message types, and may identify a misbehavior in the first V2X message or the second V2X message based on the comparison of the analogous information. The V2X processing system may take an action in response to identifying misbehavior in the first V2X message or V2X message second V2X message. For example, the V2X processing system may generate and transmit a misbehavior report indicating the identified misbehavior to a network computing device such as a Misbehavior Authority server device.

In some embodiments, the V2X processing system may compare information in a first field in the first V2X message to information in a second field in the second V2X message. The V2X processing system may select the first field in the first V2X message and the second field in the second V2X message by identifying a field in the first V2X message and a field in the second V2X message that include analogous or comparable information. In some embodiments, the V2X processing system may identify misbehavior in either the first or second V2X messages when information in the first field is inconsistent with information in the second field.

V2X processing systems may use a variety of misbehavior detectors for detecting misbehavior in V2X messages. The misbehavior detectors applied to different types of V2X messages may differ because the types of information and field locations of information varies from one type of V2X message to the next. In some embodiments, the V2X processing system may select detectors of a misbehavior detection system based on message types of the first V2X message and at least the second V2X message (and possibly other V2X messages, such as other V2X messages stored in memory). For example, the V2X processing system may select a first detector based on the first V2X message type and a second detector based on the second V2X message type. In some embodiments, the V2X processing system may select different detectors for each V2X message based on the V2X message type. For example, in response to receiving a Decentralized Environment Notification Message (DENM), that the V2X processing device may select DENM-CAM detectors. As another example, in response to receiving a CAM message, the V2X processor may select a DENM-CAM detector and a CAM-CPM detector.

In some embodiments, after the V2X processing system has selected one or more first detectors appropriate for a first V2X message of a first type and selected one or more second (and different) detectors appropriate for a second V2X message of a second and different type, the V2X processing system may use the selected detectors to compare the two (or more messages). In some embodiments, the V2X processing system may compare the information in the first field in the first V2X message of the first V2X message type to information in the second field in the second V2X message of the second V2X message type using the selected first and second detectors. In some embodiments, the V2X processing system may identify misbehavior in the first or second V2X messages when information in the first field is inconsistent with information in the second field. In some embodiments, the V2X processing system may compare a result or results of applying first detector(s) to information in the first V2X message to a result or results of applying second detector(s) to information in the second V2X message.

In some embodiments, the V2X processing system may select detectors to detect cross-type implausibility. Using detectors selected based on V2X message types, the V2X processing system may compare analogous information in V2X messages of different message types. For example, the V2X processing system may select location detectors for a BSM and a CPM. A determination that a vehicle location in the BSM shares the same location as an object indicated in the CPM would indicate cross-type implausibility of either the BSM vehicle location or the CPM object location. As another example, the V2X processing system may select trajectory detectors for a BSM and an MCM. A determination that a vehicle trajectory in the BSM is inconsistent with vehicle maneuver information in the MCM would indicate cross-type implausibility of either the BSM vehicle trajectory or the MCM vehicle maneuver information.

In some embodiments, the V2X processing system may select detectors to detect cross-type inconsistency.

In some embodiments, the V2X processing system may select vehicle dimension detectors for message types including BSM, CAM, MCM, map data (MAP), SRM, and other message types. Using detectors selected based on V2X message types, the V2X processing system may compare analogous dimension information in V2X messages of different message types, and may identify misbehavior in one of the V2X messages based on an identified inconsistency of the analogous information. Examples include: determining that a vehicle width in a BSM or CAM is not equal to a vehicle width in a maneuver message (e.g., MCM); determining that a vehicle length in a BSM or CAM is not equal to a vehicle length announced in an MCM; determining that a vehicle width in a BSM or CAM is bigger than the lane width indicated in an MCM; determining that a vehicle length in a BSM or CAM is smaller than a vehicle length indicated in an MCM; determining that a vehicle width in a BSM or CAM is bigger than a traffic lane width indicated in a MAP message; determining that a lane width indicated in an MAP message is not equal to a lane width indicated in an MCM; and determining that a vehicle type indicated in a BSM or CAM differs from a vehicle type indicated in SRM. Other examples are also possible.

In some embodiments, the V2X processing system may select vehicle position detectors based on one or more V2X message types, and may use the selected detectors to compare analogous position information in V2X messages of different message types. Based on an identified inconsistency of the analogous information, the V2X processing system may identify misbehavior in one of the V2X messages. Examples include: determining that a vehicle position indicated in a BSM or CAM is too far from a trajectory starting point indicated in an MCM; determining that a vehicle position indicated in a BSM or CAM is too far from a trajectory ending point indicated in an MCM; and determining that a position of a vehicle requesting a maneuver in an SRM or MCM is farther than a threshold distance from a position of the requesting vehicle indicated in a BSM or CAM. Other examples are also possible.

In some embodiments, the V2X processing system may select vehicle speed detectors based on one or more V2X message types, and may use the selected detectors to compare analogous speed information in V2X messages of different message types. Based on an identified inconsistency of the analogous information, the V2X processing system may identify misbehavior in one of the V2X messages. Examples include: determining that a vehicle speed indicated in a BSM or CAM is greater than a speed limit (i.e., a permitted speed) indicated in a MAP message; determining that a vehicle speed indicated in a BSM or CAM is greater than a maximum allowed speed for a maneuver indicated in an MCM; determining that a current vehicle speed indicated in a BSM or CAM is lower than the minimum allowed speed for a maneuver indicated in an MCM; determining that a minimum allowed speed for a maneuver indicated in an MCM is greater than a maximum authorized speed (speed limit) indicated in a MAP message; and determining that a maximum allowed speed for a maneuver indicated in an MCM is greater than the speed limit indicated in a MAP message. Other examples are also possible.

In some embodiments, the V2X processing system may select vehicle acceleration detectors based on one or more V2X message types, and may use the selected detectors to compare analogous acceleration information in V2X messages of different message types. Based on an identified inconsistency of the analogous information, the V2X processing system may identify misbehavior in one of the V2X messages. For example, the V2X processing system may determine that a vehicle acceleration indicated in a BSM or CAM message is greater than a vehicle acceleration reported in an MCM at a time when the vehicle performs a maneuver. As another example, the V2X processing system may determine that a current vehicle acceleration indicated in a BSM or CAM is lower than the vehicle acceleration indicated in an MCM at a time when the vehicle performs a maneuver. Other examples are also possible.

In some embodiments, the V2X processing system may select vehicle heading detectors based on one or more V2X message types, and may use the selected detectors to compare analogous heading information in V2X messages of different message types. Based on an identified inconsistency of the analogous information, the V2X processing system may identify misbehavior in one of the V2X messages. For example, the V2X processing system may determine that a current vehicle heading indicated in a BSM or CAM is different from a vehicle heading indicated in an MCM at a time when the vehicle performs a maneuver. Other examples are also possible.

In some embodiments, the V2X processing system may select vehicle free space detectors based on one or more V2X message types, and may use the selected detectors to compare analogous heading information in V2X messages of different message types. For example, the V2X processing system may determine that a V2X object indicated in a BSM or an obstacle indicated in a CPM is purportedly in an area or location that is also indicated as unoccupied, such as in a CPM that indicates that a vehicle sensor's field-of-view is unoccupied. In response to determining an inconsistency in free space information, the V2X processing system may generate a misbehavior report including the coordinates of the occupied (or purportedly occupied) area.

In some embodiments, the V2X processing system may select implausible maneuver detectors based on one or more V2X message types, and may use the selected detectors to compare analogous maneuver information in V2X messages of different message types. For example, the V2X processing system may determine an inconsistency among an MCM that indicates an intended maneuver (which may include a lane ID and a driving direction of the vehicle), in lane ID and/or driving direction indicated in a MAP message, and status information of the lane in space and time provided in a SPAT message.

In some embodiments, the V2X processing system may be configured with a memory device and a storage manager function to store a previously received V2X messages for comparing to a newly received V2X message. The V2X processing device may be configured to store V2X messages with associated security data, such as a digital signature associated with each V2X message. Storing the security data with the V2X messages may enable the V2X processing device, or another device such as a Misbehavior Authority computing device, to verify the signature of each message in a misbehavior report, enabling authentication of the V2X messages. The storage manager also may be configured to delete V2X messages based on a storage policy or retention policy. For example, V2X messages from a particular sender that are older than a threshold age may be deleted (for example, the sending vehicle may have left the receiving vehicle's communication range). As another example, an MCM may be deleted once a maneuver associated with the MCM has been completed. As another example, a certain number of V2X messages may be stored, such as ten consecutive BSMs to enable a determination of information consistency over time, and superfluous V2X messages may be deleted.

The V2X processing system may determine whether information from two (or more) V2X messages is consistent or inconsistent in both time and space. Information in fields of different V2X messages may not be inconsistent if the information is associated with different places and/or different times. For example, a traffic lane indicated as occupied in a first V2X message at first time may be indicated as unoccupied in a second V2X message at a second time, and both V2X messages may be correct (e.g., because a vehicle that earlier occupied the traffic lane has since moved to a different location), and so the first and second V2X messages are not inconsistent. In some embodiments, the V2X processing system may compare a time value and a location value associated with the first field in the first V2X message of the first V2X message type and the second field in the second V2X message. In response to identifying misbehavior in either the first V2X message or the second V2X message identifying that the time and location values associated with the first field in the first V2X message of the first V2X message type and the second field in the second V2X message are substantially the same, the V2X processing system may take an action such as transmitting a misbehavior report indicating the identified misbehavior to a network computing device. In response to identifying misbehavior in either the first or second V2X messages by identifying that the time and location values associated with the first field in the first V2X message of the first V2X message type and the second field in the second V2X message are not substantially the same, the V2X processing system may generate a correction for information in the first V2X message (or the first field) or the second V2X messages (second field).

Various embodiments improve the safety and efficiency of V2X processing systems in vehicles by enabling V2X processing systems to identify and take appropriate action in response to misbehavior detected based on a comparison of V2X messages of different types. Various embodiments improve the safety and operation of V2X networks and communication systems by enabling V2X processing systems to reduce or eliminate disruptions to network communication and road traffic that may be caused by misbehavior in V2X messages.

FIG. 1A is a system block diagram illustrating an example communication system 100 suitable for implementing the various embodiments. The communications system 100 include a 5G New Radio (NR) network, an ITS V2X wireless network, and/or any other suitable network such as a Long Term Evolution (LTE) network. References to a 5G network and 5G network elements in the following descriptions are for illustrative purposes and are not intended to be limiting.

The communications system 100 may include a heterogeneous network architecture that includes a core network 140, a number of base stations 110, and a variety of mobile devices including a vehicle 102 equipped with a V2X processing system 104 that includes wireless communication capabilities. The base station 110 may communicate with a core network 140 over a wired communication link 126. The communications system 100 also may include roadside units 112 supporting V2X communications with vehicles 102 via V2X wireless communication links 124.

A base station 110 is a network element that communicates with wireless devices (e.g., a V2X processing system 104 of the vehicle 102) via a wireless communication link 122, and may be referred to as a Node B, an LTE Evolved nodeB (eNodeB or eNB), an access point (AP), a radio head, a transmit receive point (TRP), a New Radio base station (NR BS), a 5G NodeB (NB), a Next Generation NodeB (gNodeB or gNB), or the like. Each base station 110 may provide communication coverage for a particular geographic area or "cell." In 3GPP, the term "cell" can refers to a coverage area of a base station, a base station subsystem serving this coverage area, or a combination thereof, depending on the context in which the term is used. The core network 140 may be any type of core network, such as an LTE core network (e.g., an evolved packet core (EPC) network), 5G core network, a disaggregated network as described with reference to FIG. 1B, etc.

Roadside units 112 may communicate with the core network 140 via a wired or wireless communication link 128. Roadside units 112 may communicate via V2X wireless communication links 124 with V2X processing system-equipped vehicles 102 for downloading information useful for V2X processing system autonomous and semi-autonomous driving functions, and for receiving information such as misbehavior reports from the V2X processing system 104.

A Misbehavior Authority network computing device (MA) 132 may communicate with the core network 140 via a wired or wireless communication link 127. The MA 132 may receive misbehavior reports from the V2X processing system 104 as may be sent by the V2X processing system 104 from time to time.

Wireless communication links 122 may include a plurality of carrier signals, frequencies, or frequency bands, each of which may include a plurality of logical channels. The wireless communication links 122 and 124 may utilize one or more radio access technologies (RATs). Examples of RATs that may be used in a wireless communication link include 3GPP LTE, 3G, 4G, 5G (e.g., NR), GSM, Code Division Multiple Access (CDMA), Wideband Code Division Multiple Access (WCDMA), Worldwide Interoperability for Microwave Access (WiMAX), Time Division Multiple Access (TDMA), and other mobile telephony communication technologies cellular RATs. Further examples of RATs that may be used in one or more of the various wireless communication links within the communication system 100 include medium range protocols such as Wi-Fi, LTE-U, LTE-Direct, LAA, MuLTEfire, and relatively short range RATs such as ZigBee, Bluetooth, and Bluetooth Low Energy (LE).

Figure 1B:
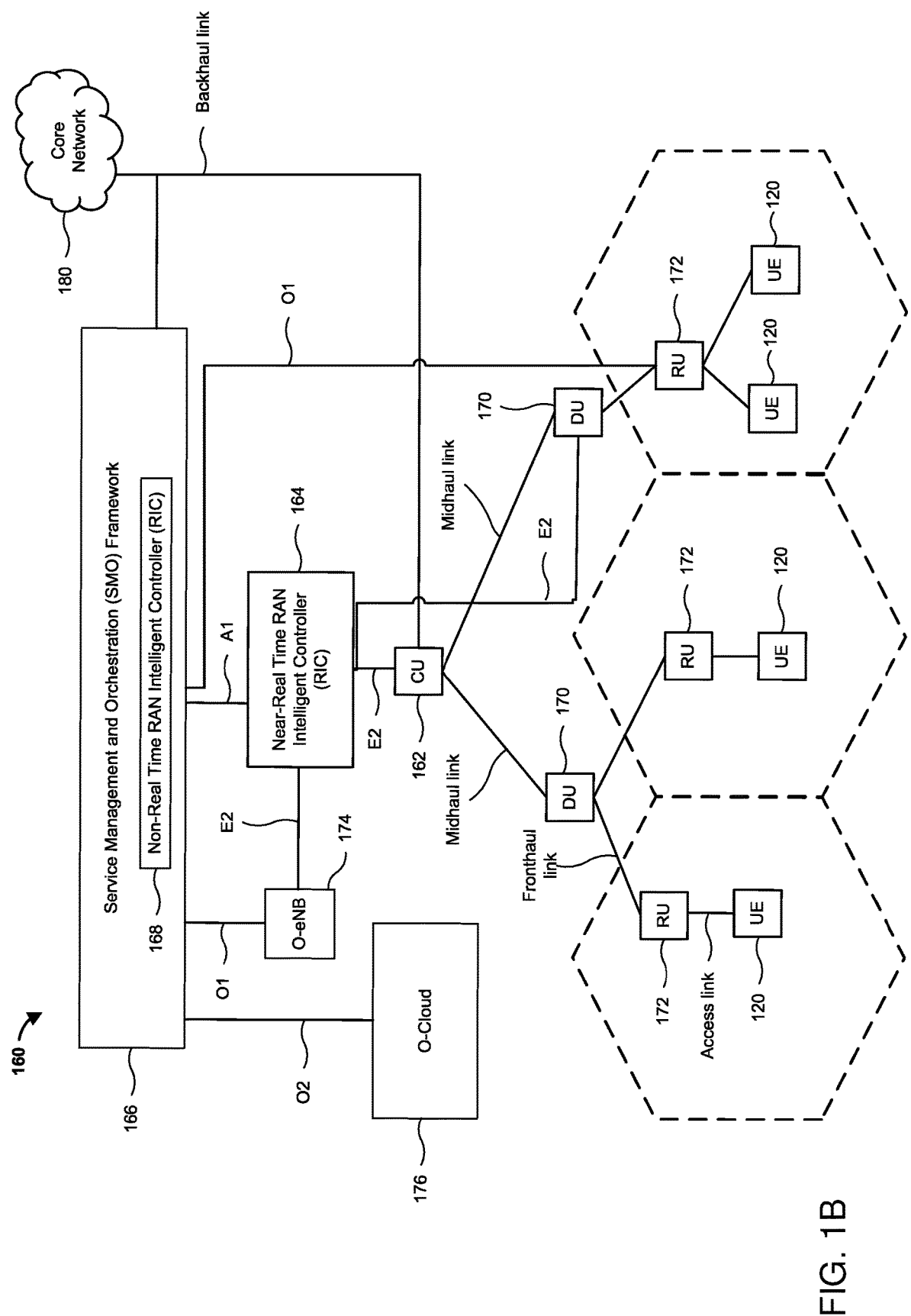
FIG. 1B is a system block diagram illustrating an example disaggregated base station architecture suitable for implementing various embodiments.

FIG. 1B is a system block diagram illustrating an example disaggregated base station 160 architecture that may be part of a V2X and/or 5G network (e.g., the communication system 100) according to any of the various embodiments. With reference to FIGS. 1A and 1B, the disaggregated base station 160 architecture may include one or more central units (CUs) 162 that can communicate directly with a core network 180 via a backhaul link, or indirectly with the core network 180 through one or more disaggregated base station units, such as a Near-Real Time (Near-RT) RAN Intelligent Controller (RIC) 164 via an E2 link, or a Non-Real Time (Non-RT) RIC 168 associated with a Service Management and Orchestration (SMO) Framework 166, or both. A CU 162 may communicate with one or more distributed units (DUs) 170 via respective midhaul links, such as an F1 interface. The DUs 170 may communicate with one or more radio units (RUs) 172 via respective fronthaul links. The RUs 172 may communicate with respective UEs 120 via one or more radio frequency (RF) access links. In some implementations, user equipment (UE), such as a V2X processing system 104, may be simultaneously served by multiple RUs 172.

Each of the units (i.e., CUs 162, DUs 170, RUs 172), as well as the Near-RT RICs 164, the Non-RT RICs 168 and the SMO Framework 166, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 162 may host one or more higher layer control functions. Such control functions may include the radio resource control (RRC), packet data convergence protocol (PDCP), service data adaptation protocol (SDAP), or the like. Each control function may be implemented with an interface configured to communicate signals with other control functions hosted by the CU 162. The CU 162 may be configured to handle user plane functionality (i.e., Central Unit-User Plane (CU-UP)), control plane functionality (i.e., Central Unit-Control Plane (CU-CP)), or a combination thereof. In some implementations, the CU 162 can be logically split into one or more CU-UP units and one or more CU-CP units. The CU-UP unit can communicate bidirectionally with the CU-CP unit via an interface, such as the E1 interface when implemented in an O-RAN configuration. The CU 162 can be implemented to communicate with DUs 170, as necessary, for network control and signaling.

The DU 170 may correspond to a logical unit that includes one or more base station functions to control the operation of one or more RUs 172. In some aspects, the DU 170 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3rd Generation Partnership Project (3GPP). In some aspects, the DU 170 may further host one or more low PHY layers. Each layer (or module) may be implemented with an interface configured to communicate signals with other layers (and modules) hosted by the DU 170, or with the control functions hosted by the CU 162.

Lower-layer functionality may be implemented by one or more RUs 172. In some deployments, an RU 172, controlled by a DU 170, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 172 may be implemented to handle over the air (OTA) communication with one or more UEs 120. In some implementations, real-time and non-real-time aspects of control and user plane communication with the RU(s) 172 may be controlled by the corresponding DU 170. In some scenarios, this configuration may enable the DU(s) 170 and the CU 162 to be implemented in a cloud-based radio access network (RAN) architecture, such as a vRAN architecture.

The SMO Framework 166 may be configured to support RAN deployment and provisioning of non-virtualized and virtualized network elements. For non-virtualized network elements, the SMO Framework 166 may be configured to support the deployment of dedicated physical resources for RAN coverage requirements, which may be managed via an operations and maintenance interface (such as an O1 interface). For virtualized network elements, the SMO Framework 166 may be configured to interact with a cloud computing platform (such as an open cloud (O-Cloud) 176) to perform network element life cycle management (such as to instantiate virtualized network elements) via a cloud computing platform interface (such as an O2 interface). Such virtualized network elements can include, but are not limited to, CUs 162, DUs 170, RUs 172 and Near-RT RICs 164. In some implementations, the SMO Framework 166 may communicate with a hardware aspect of a 4G RAN, such as an open eNB (O-eNB) 174, via an O1 interface. Additionally, in some implementations, the SMO Framework 166 may communicate directly with one or more RUs 172 via an O1 interface. The SMO Framework 166 also may include a Non-RT RIC 168 configured to support functionality of the SMO Framework 166.

The Non-RT RIC 168 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 164. The Non-RT RIC 168 may be coupled to or communicate with (such as via an A1 interface) the Near-RT RIC 164. The Near-RT RIC 164 may be configured to include a logical function that enables near-real-time control and optimization of RAN elements and resources via data collection and actions over an interface (such as via an E2 interface) connecting one or more CUs 162, one or more DUs 170, or both, as well as an O-eNB, with the Near-RT RIC 164.

In some implementations, to generate AI/ML models to be deployed in the Near-RT RIC 164, the Non-RT RIC 168 may receive parameters or external enrichment information from external servers. Such information may be utilized by the Near-RT RIC 164 and may be received at the SMO Framework 166 or the Non-RT RIC 168 from non-network data sources or from network functions. In some examples, the Non-RT RIC 168 or the Near-RT RIC 164 may be configured to tune RAN behavior or performance. For example, the Non-RT RIC 168 may monitor long-term trends and patterns for performance and employ AI/ML models to perform corrective actions through the SMO Framework 166 (such as reconfiguration via O1) or via creation of RAN management policies (such as A1 policies).

Figure 1C:
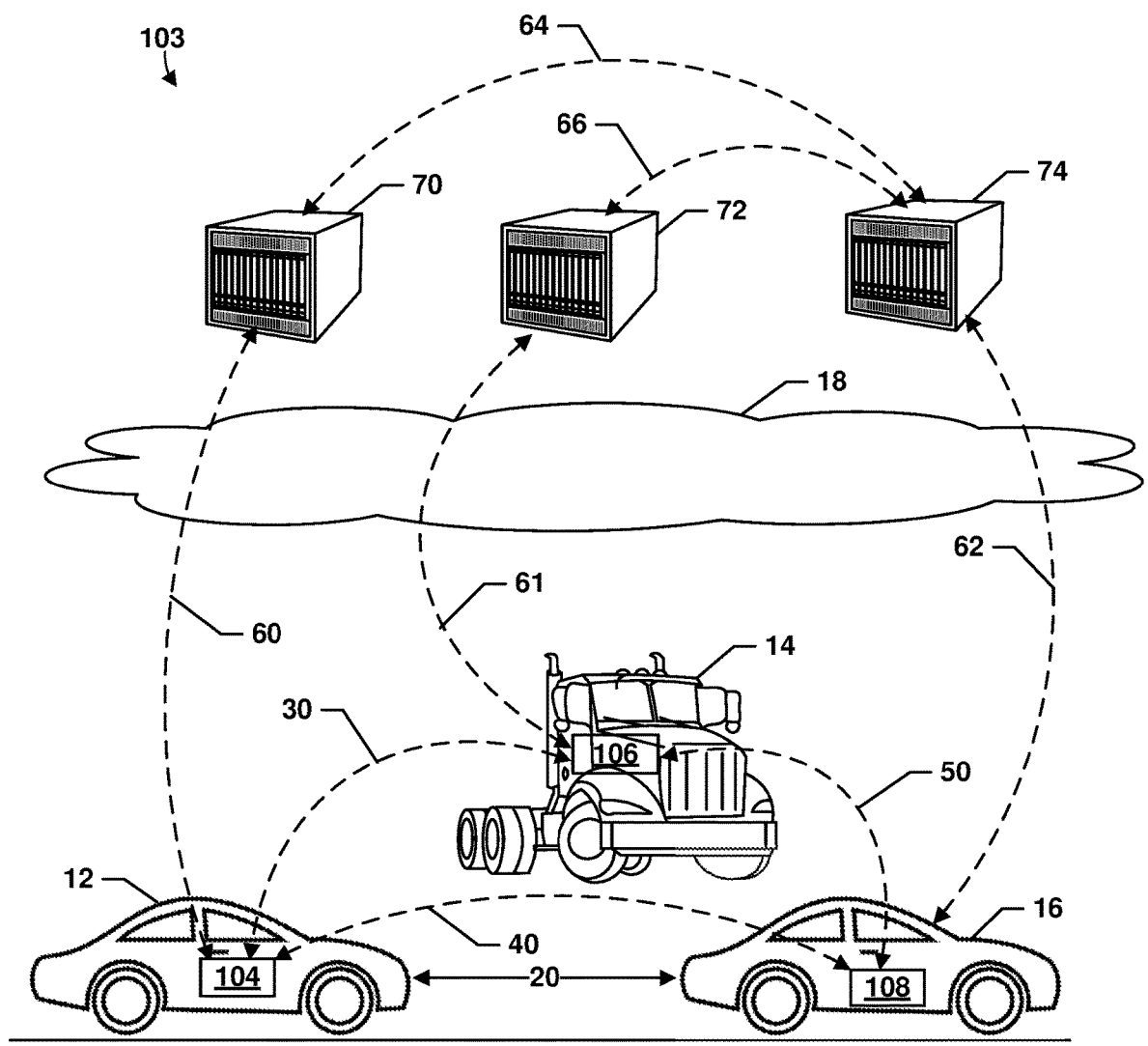
FIG. 1C is a system block diagram illustrating a communication system suitable for implementing various embodiments.

FIG. 1C is a system block diagram illustrating a communication system 103 suitable for implementing various embodiments. With reference to FIGS. 1A-1C, the communication system 103 may include three vehicles 12, 14, 16. Each vehicle 12, 14, 16 may include a V2X processing system 104, 106, 108, respectively, each configured to periodically broadcast V2X messages 30, 40, 50 such as BSM, CAM, MCM, MAP, SRM, and other types of V2X messages for receipt and processing by other vehicles' V2X processing systems (e.g., 104, 106, 108). By sharing the vehicle location, speed, direction, braking, and other information, vehicles can maintain safe separation and identify and avoid potential collisions. For example, a trailing vehicle 12 receiving V2X messages 40 from a leading vehicle 16 can determine the speed and location of the vehicle 16, which in turn enables vehicle 12 to match the speed and maintain a safe separation distance 20. By being informed through V2X messages 40 when the leading vehicles 16 applies the brakes, the V2X processing system 102 in the trailing vehicle 12 can apply brakes simultaneously to maintain the safe separation distance 20 even when the leading vehicle 16 stops suddenly. As another example, the V2X processing system 104 within the truck vehicle 14 may receive V2X messages 30, 50 from the two vehicles 12, 16, and thus be informed that the truck vehicle 14 should stop at the intersection to avoid a collision. Each of the vehicle V2X on-board equipment 104, 106, 108 may communicate with one another using any of a variety close proximity communication protocols. In addition, the vehicles may be able to transmit data and information regarding detected V2X messages as well as a misbehavior report about detected V2X misbehavior to an original equipment manufacturer (OEM) (70, 72) and/or MA 74 (e.g., 132) via communication links 60, 61, 62 through a communication network 18. The misbehavior report may be transmitted directly to the MA 74 (e.g., via communication link 64, 66). In other embodiments, the misbehavior report may first be transmitted to a misbehavior report pre-processing unit such as the OEM servers 70, 72 for pre-processing through communication links 64, 66. Then the pre-processed misbehavior report may be transmitted from the misbehavior report pre-processing servers 70, 72 to the MA 74 through communication links 64, 66. In other embodiments, a misbehavior report may be received from a vehicle, such as from vehicle 16, at the MA 74. The MA 74 may relay the received misbehavior report from the vehicle 16 onto OEM servers 70, 72 via communication links 64, 66. In addition, the OEM servers 70, 72 may provide confirmation reports to the MA 74 via communication links 64, 66.

Figure 2A:
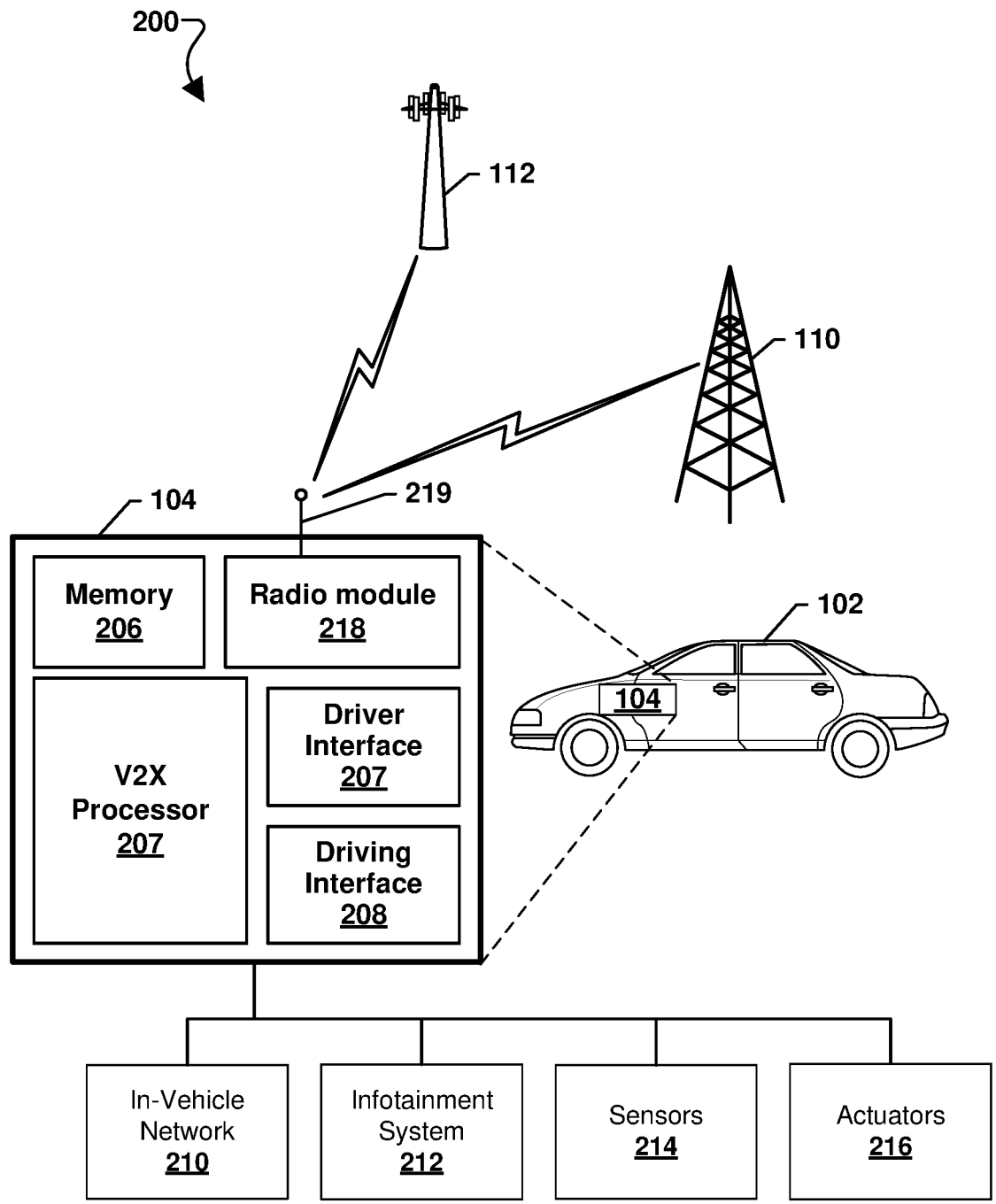
FIG. 2A is a component diagram of an example vehicle V2X processing system suitable for implementing various embodiments.

FIG. 2A is a component diagram of an example vehicle V2X processing system 200 suitable for implementing various embodiments. With reference to FIGS. 1A-2A, the processing system 200 may include a vehicle 102 that includes a V2X processing system 104. The vehicle V2X processing system 104 may communicate with various systems and devices, such as an in-vehicle network 210, an infotainment system 212, various sensors 214, various actuators 216, and a radio module 218 coupled to an antenna 219. The vehicle V2X processing system 104 also may communicate with roadside units 112, cellular communication network base stations 110, and other external devices.

The V2X processing system 104 may include a processor 205, memory 206, an input module 207, an output module 208 and the radio module 218. The processor 205 may be coupled to the memory 206 (i.e., a non-transitory storage medium), and may be configured with processor-executable instructions stored in the memory 206 to perform operations of the methods according to various embodiments described herein. Also, the processor 205 may be coupled to the output module 208, which may control in-vehicle displays, and to the input module 207 to receive information from vehicle sensors as well as driver inputs.

The V2X processing system 104 may include a V2X antenna 219 coupled to the radio module 218 that is configured to communicate with one or more ITS participants (e.g., stations), a roadside unit 112, and a base station 110 or another suitable network access point. The V2X antenna 219 and radio module 218 may be configured to receive dynamic traffic flow feature information via vehicle-to-everything (V2X) communications. In various embodiments, the V2X processing system may receive information from a plurality of information sources, such as the in-vehicle network 210, infotainment system 212, various sensors 214, various actuators 216, and the radio module 218. The V2X processing system may be configured to perform autonomous or semi-autonomous driving functions using map data in addition to sensor data, as further described below.

Examples of an in-vehicle network 210 include a Controller Area Network (CAN), a Local Interconnect Network (LIN), a network using the FlexRay protocol, a Media Oriented Systems Transport (MOST) network, and an Automotive Ethernet network. Examples of vehicle sensors 214 include a location determining system (such as a Global Navigation Satellite Systems (GNSS) system, a camera, radar, lidar, ultrasonic sensors, infrared sensors, and other suitable sensor devices and systems. Examples of vehicle actuators 216 include various physical control systems such as for steering, brakes, engine operation, lights, directional signals, and the like.

Figure 2B:
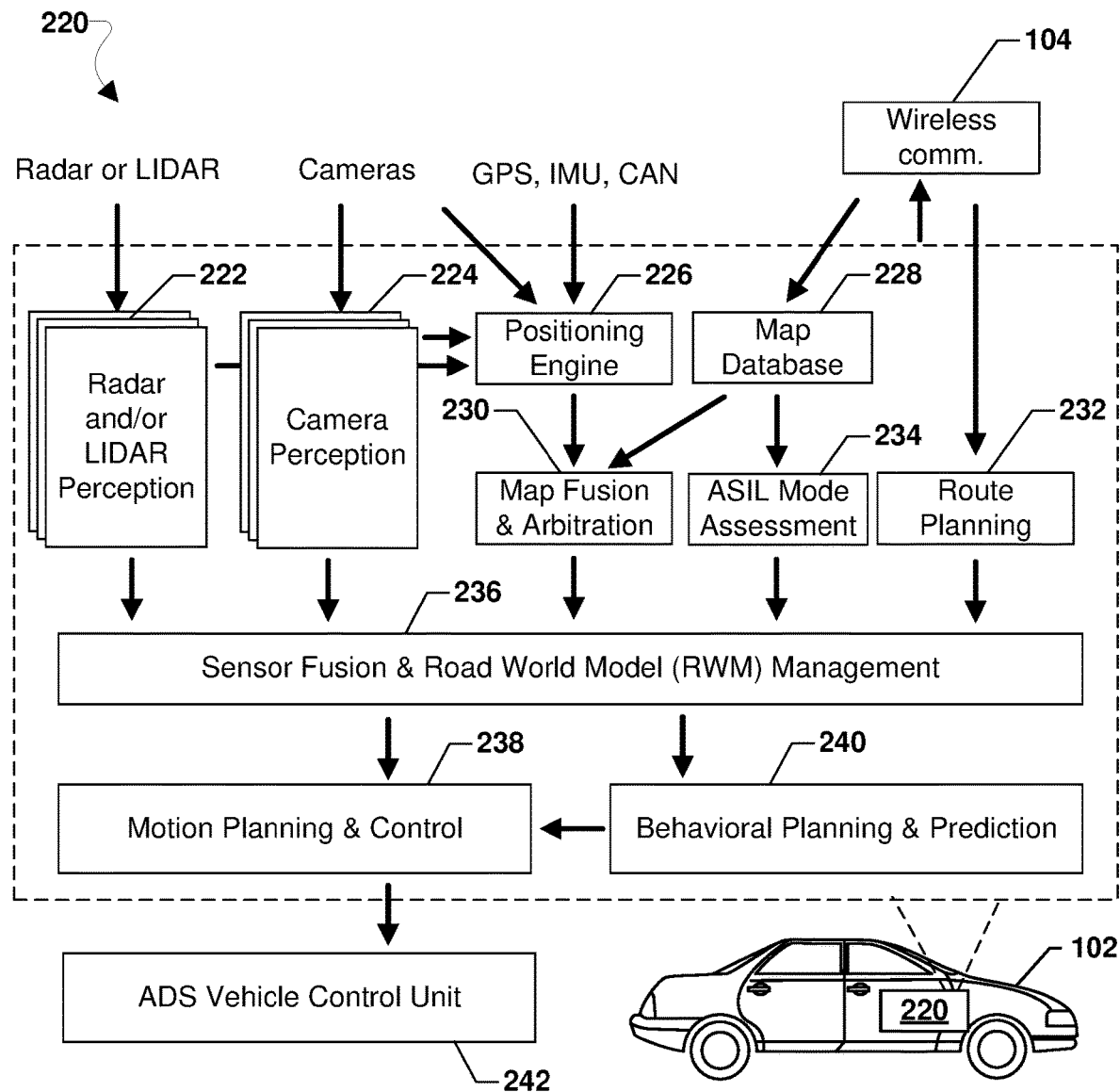
FIG. 2B is a component block diagram illustrating components of an example vehicle autonomous/semiautonomous driving system suitable for implementing various embodiments.

FIG. 2B is a component block diagram illustrating components of an example vehicle autonomous/semiautonomous driving system 220, which may be coupled to the V2X processing system 104 and suitable for implementing various embodiments. The autonomous/semiautonomous driving system 220 may include various subsystems, communication elements, computational elements, computing devices or units which may be utilized within a vehicle 102. With reference to FIGS. 1A-2A, the various computational elements, computing devices or units within the autonomous/semiautonomous driving system 220 may be implemented within a system of computing devices (i.e., subsystems) that communicate data and commands to each other via the in-vehicle network 210 (e.g., indicated by the arrows in FIG. 2B). In some implementations, the various computational elements, computing devices or units within the autonomous/semiautonomous driving system 220 may be implemented within a single computing device, such as separate threads, processes, algorithms or computational elements. Therefore, each subsystem/computational element illustrated in FIG. 2B is also generally referred to herein as a "layer" within a computational "stack" that constitutes the vehicle autonomous/semiautonomous driving system 220. However, the use of the terms layer and stack in describing various embodiments are not intended to imply or require that the corresponding functionality is implemented within a single vehicle computing device, although that is a potential implementation embodiment. Rather the use of the term "layer" is intended to encompass subsystems with independent processors, computational elements (e.g., threads, algorithms, subroutines, etc.) running in one or more computing devices, and combinations of subsystems and computational elements.

The autonomous/semiautonomous driving system 220 may include a radar and/or lidar perception layer 222, a camera perception layer 224, a positioning engine layer 226, a map database 228, a map fusion and arbitration layer 230, a route planning layer 232, an operating mode assessment layer 234, a sensor fusion and road world model (RWM) management layer 236, a motion planning and control layer 238, and a behavioral planning and prediction layer 240. The layers 222-240 are merely examples of some layers in one example configuration of the autonomous/semiautonomous driving system 220. In other configurations, other layers may be included, such as additional layers for other perception sensors (e.g., a lidar perception layer, etc.), additional layers for planning and/or control, additional layers for modeling, etc., and/or certain of the layers 222-240 may be excluded from the autonomous/semiautonomous driving system 220. Each of the layers 222-240 may exchange data, computational results and commands as illustrated by the arrows in FIG. 2B.

Further, the autonomous/semiautonomous driving system 220 may receive and process data from sensors (e.g., radar, lidar, cameras, inertial measurement units (IMU) etc.), navigation information sources (e.g., Global Positioning System (GPS) receivers, IMUs, etc.), vehicle networks (e.g., Controller Area Network (CAN) bus), and databases in memory (e.g., digital map data). The autonomous/semiautonomous driving system 220 may output vehicle control commands or signals to an autonomous driving system (ADS) vehicle control unit 242, which is a system, subsystem or computing device that interfaces directly with vehicle steering, throttle and brake controls. The configuration of the autonomous/ semiautonomous driving system 220 and ADS vehicle control unit 242 illustrated in FIG. 2A is merely an example configuration and other configurations of a vehicle management system and other vehicle components may be used.

The radar and/or lidar perception layer 222 may receive data from one or more detection and ranging sensors, such as radar (e.g., 132) and/or lidar (e.g., 138), and process the data to recognize and determine locations of other vehicles and objects within a vicinity of the vehicle 100. The radar perception layer 222 may include use of neural network processing and artificial intelligence methods to recognize objects and vehicles, and pass such information on to the sensor fusion and RWM management layer 236.

The camera perception layer 224 may receive data from one or more cameras, such as cameras, and process the data to recognize and determine locations of other vehicles and objects within a vicinity of the vehicle 100. The camera perception layer 224 may include use of neural network processing and artificial intelligence methods to recognize objects and vehicles, and pass such information on to the sensor fusion and RWM management layer 236.

The positioning engine layer 226 may receive data from the radar and/or lidar perception layer 222, the camera perception layer 224, and various sources of navigation information, and process the data and information to determine a position of the vehicle 100. Various sources of navigation information may include, but is not limited to, a GPS receiver, an IMU, and/or other sources and sensors connected via a CAN bus. The positioning engine layer 226 may also utilize inputs from one or more cameras, such as cameras and/or any other available sensor capable of identifying and determining directions and distances to objects in the vicinity of the vehicle, such as radars, lidars, etc.

The autonomous/semiautonomous driving system 220 may include or be coupled to a vehicle V2X processing system 104 according to various embodiments. One or more of the layers 222-240 may provide information to or receive information from the V2X processing system 104. The V2X processing system 104 may be configured to communicate with highway communication systems, such as via V2X communication links (e.g., 124) and/or to remote information sources (e.g., computing device 132) via cellular wireless communication links (e.g., 122), such as via 5G cellular networks.

The map fusion and arbitration layer 230 may access the map database 228 for location information regarding nearby objects and features, and receive localizing/navigation information output from the positioning engine layer 226, and process the data to further determine the position of the vehicle 102 within the map, such as location within a lane of traffic, position within a street map, etc. sensor data may be stored in a memory (e.g., memory 312). Location information of map objects and features, sensor and GPS position fixes all include some error, so the map fusion and arbitration layer 230 may function to determine a best guess location of the vehicle within a roadway based upon an arbitration between the GPS coordinates, sensor data, and map data regarding objects and features in and near the roadway. The map fusion and arbitration layer 230 may pass arbitrated map location information to the sensor fusion and RWM management layer 236.

The route planning layer 232 may utilize sensor data, as well as inputs from an operator or dispatcher to plan a route to be followed by the vehicle 102 to a particular destination. The route planning layer 232 may pass map-based location information to the sensor fusion and RWM management layer 236.

In embodiments including an operating mode assessment layer 234, that processing layer may use safety and/or confidence information regarding nearby objects and features to select an appropriate ADS driving mode. In some embodiments, the operating mode assessment layer 234 may determine whether the current autonomous or semi-autonomous driving mode is consistent with or appropriate in view of safety and/or confidence information regarding nearby objects and features in the driving environment.

The sensor fusion and RWM management layer 236 may receive data and outputs produced by the radar and/or lidar perception layer 222, camera perception layer 224, map fusion and arbitration layer 230, route planning layer 232, and the operating mode assessment layer 234, and use some or all of such inputs to estimate or refine the location and state of the vehicle 102 in relation to the road, other vehicles on the road, and other objects within a vicinity of the vehicle 100. The sensor fusion and RWM management layer 236 may output refined location and state information of the vehicle 100, as well as refined location and state information of other vehicles and objects in the vicinity of the vehicle, to the motion planning and control layer 238 and/or the behavior planning and prediction layer 240.

The behavioral planning and prediction layer 240 of the autonomous vehicle V2X processing system 220 may use the refined location and state information of the vehicle 102 and location and state information of other vehicles and objects output from the sensor fusion and RWM management layer 236 to predict future behaviors of other vehicles and/or objects. The motion planning and control layer 238 may receive data and information outputs from the sensor fusion and RWM management layer 236, map data from the map database 232, and other vehicle and object behavior as well as location predictions from the behavior planning and prediction layer 240, and use this information to plan and generate control signals for controlling the motion of the vehicle 102 and to verify that such control signals meet safety requirements for the vehicle 100.

The ADS vehicle control unit 242 may receive the commands or instructions from the motion planning and control layer 238 and translate such information into mechanical control signals for controlling wheel angle, brake and throttle of the vehicle 100. For example, ADS vehicle control unit 242 may respond to the computed steering wheel command angle by sending corresponding control signals to the steering wheel controller.

In various embodiments, the V2X processing system 104 may communicate with other V2X processing system participants (e.g., other vehicles 12, 14, 16) via wireless communication links to transmit sensor data, position data, vehicle data and data gathered about the environment around the vehicle by onboard sensors. Such information may be used by other V2X processing system participants to update stored sensor data for relay to other V2X processing system participants.

In addition to identifying misbehavior in V2X messages, in some embodiments the vehicle V2X processing system 220 may include functionality that performs safety checks or oversight of various commands, planning or other decisions of various layers that could impact vehicle and occupant safety. Such safety check or oversight functionality may be implemented within a dedicated layer or distributed among various layers and included as part of the functionality.

Figure 3A:
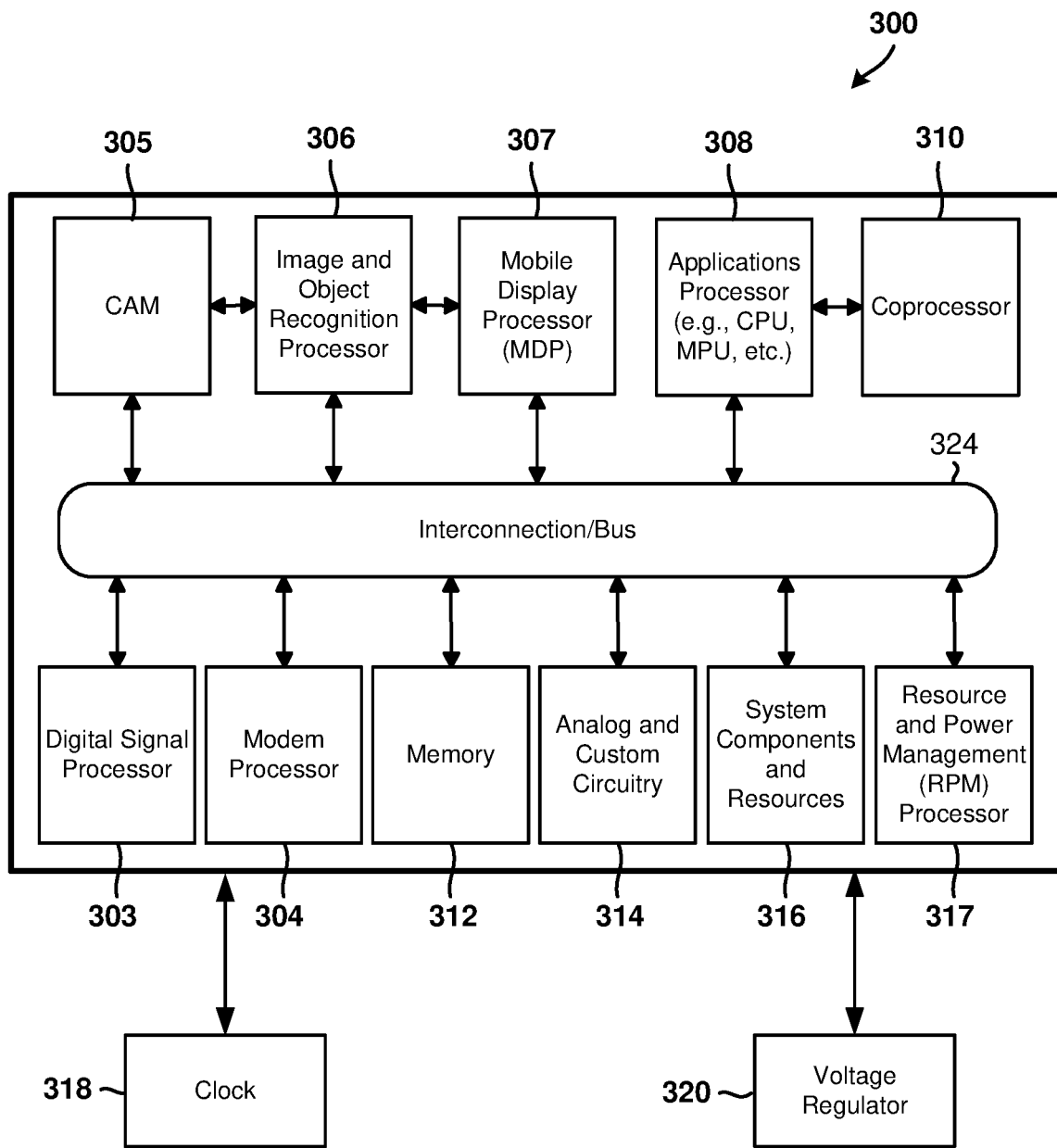
FIG. 3A is a block diagram illustrating components of a system on chip for use in a vehicle V2X processing system in accordance with various embodiments.

FIG. 3A is a block diagram illustrating an example components of a system on chip (SOC) 300 for use in a vehicle V2X processing system in accordance with various embodiments. With reference to FIGS. 1A-3A, the processing device SOC 300 may include a number of heterogeneous processors, such as a digital signal processor (DSP) 303, a modem processor 304, an image and object recognition processor 306, a mobile display processor 307, an applications processor 308, and a resource and power management (RPM) processor 317. The processing device SOC 300 may also include one or more coprocessors 310 (e.g., vector co-processor) connected to one or more of the heterogeneous processors 303, 304, 306, 307, 308, 317.

Each of the processors may include one or more cores, and an independent/internal clock. Each processor/core may perform operations independent of the other processors/cores. For example, the processing device SOC 300 may include a processor that executes a first type of operating system (e.g., FreeBSD, LINUX, OS X, etc.) and a processor that executes a second type of operating system (e.g., Microsoft Windows). In some embodiments, the applications processor 308 may be the SOC's 300 main processor, central processing unit (CPU), microprocessor unit (MPU), arithmetic logic unit (ALU), etc. The graphics processor 306 may be graphics processing unit (GPU).

The processing device SOC 300 may include analog circuitry and custom circuitry 314 for managing sensor data, analog-to-digital conversions, wireless data transmissions, and for performing other specialized operations, such as processing encoded audio and video signals for rendering in a web browser. The processing device SOC 300 may further include system components and resources 316, such as voltage regulators, oscillators, phase-locked loops, peripheral bridges, data controllers, memory controllers, system controllers, access ports, timers, and other similar components used to support the processors and software clients (e.g., a web browser) running on a computing device.

The processing device SOC 300 also include specialized circuitry for camera actuation and management (CAM) 305 that includes, provides, controls and/or manages the operations of one or more cameras (e.g., a primary camera, webcam, 3D camera, etc.), the video display data from camera firmware, image processing, video preprocessing, video front-end (VFE), in-line JPEG, high definition video codec, etc. The CAM 305 may be an independent processing unit and/or include an independent or internal clock.

In some embodiments, the image and object recognition processor 306 may be configured with processor-executable instructions and/or specialized hardware configured to perform image processing and object recognition analyses involved in various embodiments. For example, the image and object recognition processor 306 may be configured to perform the operations of processing images received from cameras via the CAM 305 to recognize and/or identify other vehicles, and otherwise perform functions of the camera perception layer 224 as described. In some embodiments, the processor 306 may be configured to process radar or lidar data and perform functions of the radar and/or lidar perception layer 222 as described.

The system components and resources 316, analog and custom circuitry 314, and/or CAM 305 may include circuitry to interface with peripheral devices, such as cameras, radar, lidar, electronic displays, wireless communication devices, external memory chips, etc. The processors 303, 304, 306, 307, 308 may be interconnected to one or more memory elements 312, system components and resources 316, analog and custom circuitry 314, CAM 305, and RPM processor 317 via an interconnection/bus module 324, which may include an array of reconfigurable logic gates and/or implement a bus architecture (e.g., CoreConnect, AMBA, etc.). Communications may be provided by advanced interconnects, such as high-performance networks-on chip (NoCs).

The processing device SOC 300 may further include an input/output module (not illustrated) for communicating with resources external to the SOC, such as a clock 318 and a voltage regulator 320. Resources external to the SOC (e.g., clock 318, voltage regulator 320) may be shared by two or more of the internal SOC processors/cores (e.g., a DSP 303, a modem processor 304, a graphics processor 306, an applications processor 308, etc.).

In some embodiments, the processing device SOC 300 may be included in a control unit (e.g., 140) for use in a vehicle (e.g., 100). The control unit may include communication links for communication with a telephone network (e.g., 180), the Internet, and/or a network server (e.g., 184) as described.

The processing device SOC 300 may also include additional hardware and/or software components that are suitable for collecting sensor data from sensors, including motion sensors (e.g., accelerometers and gyroscopes of an IMU), user interface elements (e.g., input buttons, touch screen display, etc.), microphone arrays, sensors for monitoring physical conditions (e.g., location, direction, motion, orientation, vibration, pressure, etc.), cameras, compasses, GPS receivers, communications circuitry (e.g., Bluetooth®, WLAN, WiFi, etc.), and other well-known components of modern electronic devices.

Figure 3B:
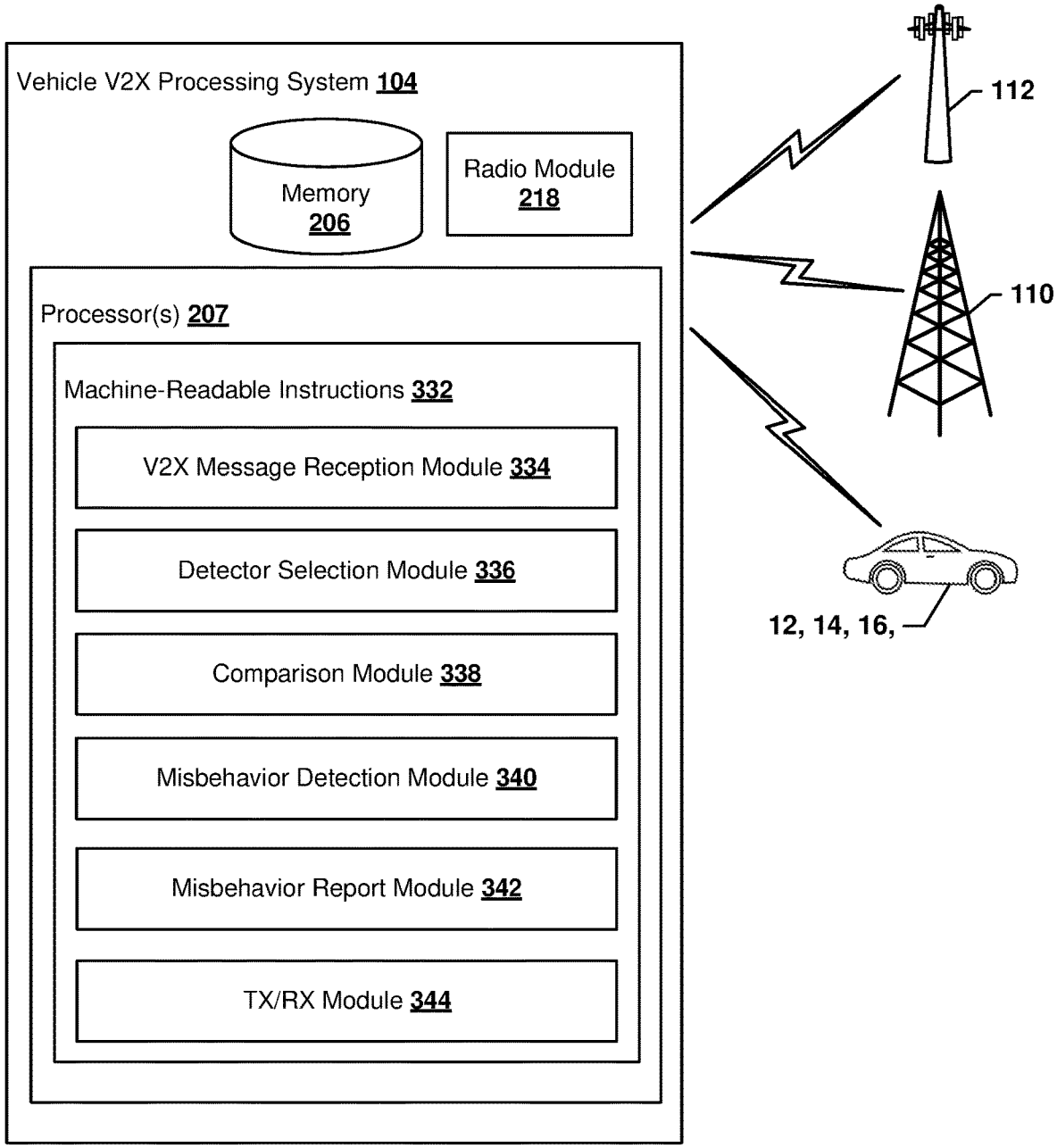
FIG. 3B is a component block diagram illustrating elements of a vehicle V2X processing system configured in accordance with various embodiments.

FIG. 3B is a component block diagram illustrating elements of a vehicle V2X processing system 104 configured in accordance with various embodiments. With reference to FIGS. 1A-3B, the V2X processing system 104 of a vehicle (e.g., 102) may be configured to communicate with a roadside unit 112, a cellular network base station 110, and/or one or more other vehicles 12, 14, 16.

The vehicle V2X processing system 104 may include one or more processors 205, memory 206, a radio module 218, and other components. The vehicle processing system 104 may include a plurality of hardware, software, and/or firmware components operating together to provide the functionality attributed herein to the processor 205.

The memory 206 may include non-transitory storage media that electronically stores information. The electronic storage media of memory 206 may include one or both of system storage that is provided integrally (i.e., substantially non-removable) with the vehicle processing system 104 and/or removable storage that is removably connectable to the vehicle V2X processing system 104 via, for example, a port (e.g., a universal serial bus (USB) port, a firewire port, etc.) or a drive (e.g., a disk drive, etc.). In various embodiments, memory 206 may include one or more of electrical charge-based storage media (e.g., EEPROM, RAM, etc.), solid-state storage media (e.g., flash drive, etc.), optically readable storage media (e.g., optical disks, etc.), magnetically readable storage media (e.g., magnetic tape, magnetic hard drive, floppy drive, etc.), and/or other electronically readable storage media.

The memory 206 may include one or more virtual storage resources (e.g., cloud storage, a virtual private network, and/or other virtual storage resources). Memory 206 may store software algorithms, information determined by processor(s) 205, information received from the one or more other vehicles 12, 14, 16, information received from the roadside unit 112, information received from the base station 110, and/or other information that enables the vehicle V2X processing system 104 to function as described herein.

The processor(s) 205 may include one of more local processors that may be configured to provide information processing capabilities in the vehicle V2X processing system 104. As such, the processor(s) 205 may include one or more of a digital processor, an analog processor, a digital circuit designed to process information, an analog circuit designed to process information, a state machine, and/or other mechanisms for electronically processing information. Although the processor(s) 205 is shown in FIG. 3B as a single entity, this is for illustrative purposes only. In some embodiments, the processor(s) 205 may include a plurality of processing units. These processing units may be physically located within the same device, or the processor(s) 205 may represent processing functionality of a plurality of devices distributed in the vehicle and operating in coordination.

The vehicle V2X processing system 104 may be configured by machine-readable instructions 332, which may include one or more instruction modules. The instruction modules may include computer program modules. In various embodiments, the instruction modules may include one or more of a V2X message reception module 334, a detector selection module 336, a comparison module 338, a misbehavior detection module 340, a misbehavior report module 342, a TX/RX module 344, and/or other modules.

The V2X message reception module 334 may be configured to receive a V2X message from another vehicle (e.g., 12, 14, 16).

The detector selection module 336 may be configured to select a first detector based on the first V2X message type and a second detector based on the second V2X message type. The detector selection module 336 may be configured to select one or more detectors based on a V2X message type in a received V2X message and/or in a V2X message stored in the memory 206. The detector selection module 336 may be configured to select a first field in the first V2X message and a second field in the second V2X message by identifying a field in the first V2X message and a field in the second V2X message that include analogous information.

The comparison module 338 may be configured to compare a first field in a first V2X message of a first V2X message type to a second field in a second V2X message of a second V2X message type. The first and second V2X message types may be different. The comparison module 338 may be configured to compare the first field in the first V2X message of the first V2X message type to the second field in the second V2X message of the second V2X message type using the selected (e.g., first and second) detectors. In some embodiments, the comparison module 330 may be configured to compare a result of applying the first detector to information in the first V2X message to a result of applying the second detector to information in the second V2X message. The comparison module 330 also may be configured to compare a time value and a location value associated with the first field in the first V2X message of the first V2X message type and the second field in the second V2X message.

The misbehavior detection module 340 may be configured to identify misbehavior in either the first V2X message or the second V2X message based on the comparison of the first V2X message and the second V2X message. The misbehavior detection module 340 may be configured to identify misbehavior in either the first or second V2X messages when information in the first field is inconsistent with information in the second field.

The misbehavior report module 342 may be configured to take an action in response to identifying misbehavior in the first V2X message or the second V2X message. The misbehavior report module 342 may be configured to generate a misbehavior report indicating the identified misbehavior. The misbehavior report module 342 also may be configured to generate a correction for information in the first field or the second field when one of the time and location values associated with the first field in the first V2X message of the first V2X message type and the second field in the second V2X message are not substantially the same The TX/RX module 344 may be configured to control the operations of communication devices of the vehicle processing system such as the radio module 218. The TX/RX module 344 may be configured to transmit a generated misbehavior report indicating the identified misbehavior to a network computing device, such as the Misbehavior Authority computing device 132.

The processor(s) 207 may be configured to execute the modules 332-344 and/or other modules by software, hardware, firmware, some combination of software, hardware, and/or firmware, and/or other mechanisms for configuring processing capabilities on processor(s) 205.

The description of the functionality provided by the different modules 332-344 is for illustrative purposes, and is not intended to be limiting, as any of modules 332-344 may provide more or less functionality than is described. For example, one or more of modules 332-344 may be eliminated, and some or all of its functionality may be provided by other ones of modules 332-344. As another example, processor(s) 207 may be configured to execute one or more additional modules that may perform some or all of the functionality attributed below to one of modules 332-344.

Figure 4A:
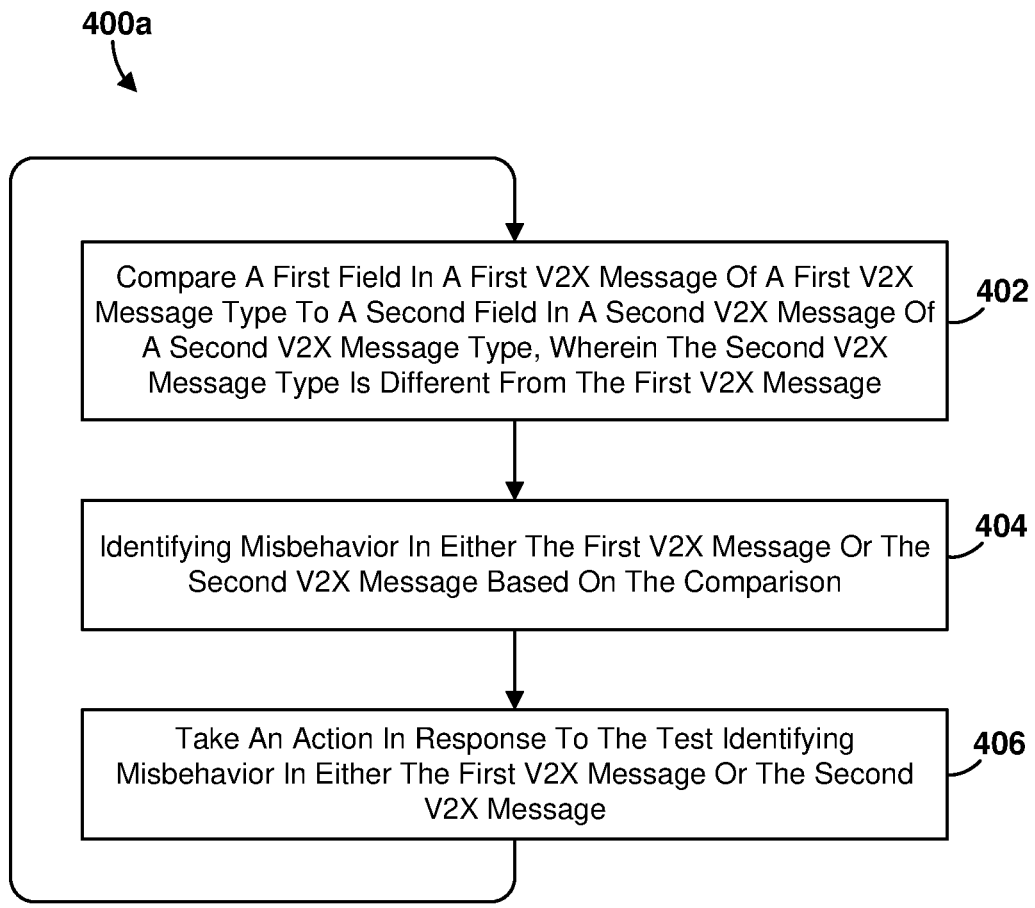
FIG. 4A is a process flow diagram of an example method performed by a processor of a V2X processing system in a vehicle for misbehavior detection in a V2X message in accordance with various embodiments.

FIG. 4A is a process flow diagram of an example method 400a performed by a processor of a V2X processing system in a vehicle for misbehavior detection in a V2X message in accordance with various embodiments. With reference to FIGS. 1A-4A, the method 400a may be performed by one or more processors (e.g., 205, 300) of a V2X processing system or other vehicle processor (e.g., 205, 220, 300) that may be implemented in hardware elements, software elements, or a combination of hardware and software elements.

In block 402, the V2X processing system may compare a first field in a first V2X message of a first V2X message type to a second field in a second V2X message of a second V2X message type, wherein the second V2X message type is different from the first V2X message. Means for performing the operations of block 402 may include a processor (e.g., 205, 303, 304, 306, 307, 308, 310) executing the V2X message reception module 334 and the detector selection module 336, and the radio module 218.

In block 404, the V2X processing system may identify misbehavior in either the first V2X message or the second V2X message based on the comparison. In some embodiments, the V2X processing system may identify misbehavior in either the first V2X message or the second V2X message when information in the first field is inconsistent with information in the second field. Means for performing the operations of block 404 may include a processor (e.g., 205, 303, 304, 306, 307, 308, 310) executing the V2X message reception module 334 and the detector selection module 336.

In block 406, the V2X processing system may take an action in response to identifying misbehavior in the first V2X message or the second V2X message. In some embodiments, the V2X processing system may transmit a misbehavior report indicating the identified misbehavior to a network computing device. Means for performing the operations of block 406 may include a processor (e.g., 205, 303, 304, 306, 307, 308, 310) executing the misbehavior report module 342 and the TX/RX module 344, and the radio module 218.

The V2X processing system may repeat the operations of blocks 402-406 from time to time, such as periodically or in response to receiving one or more V2X messages.

Figure 4B:
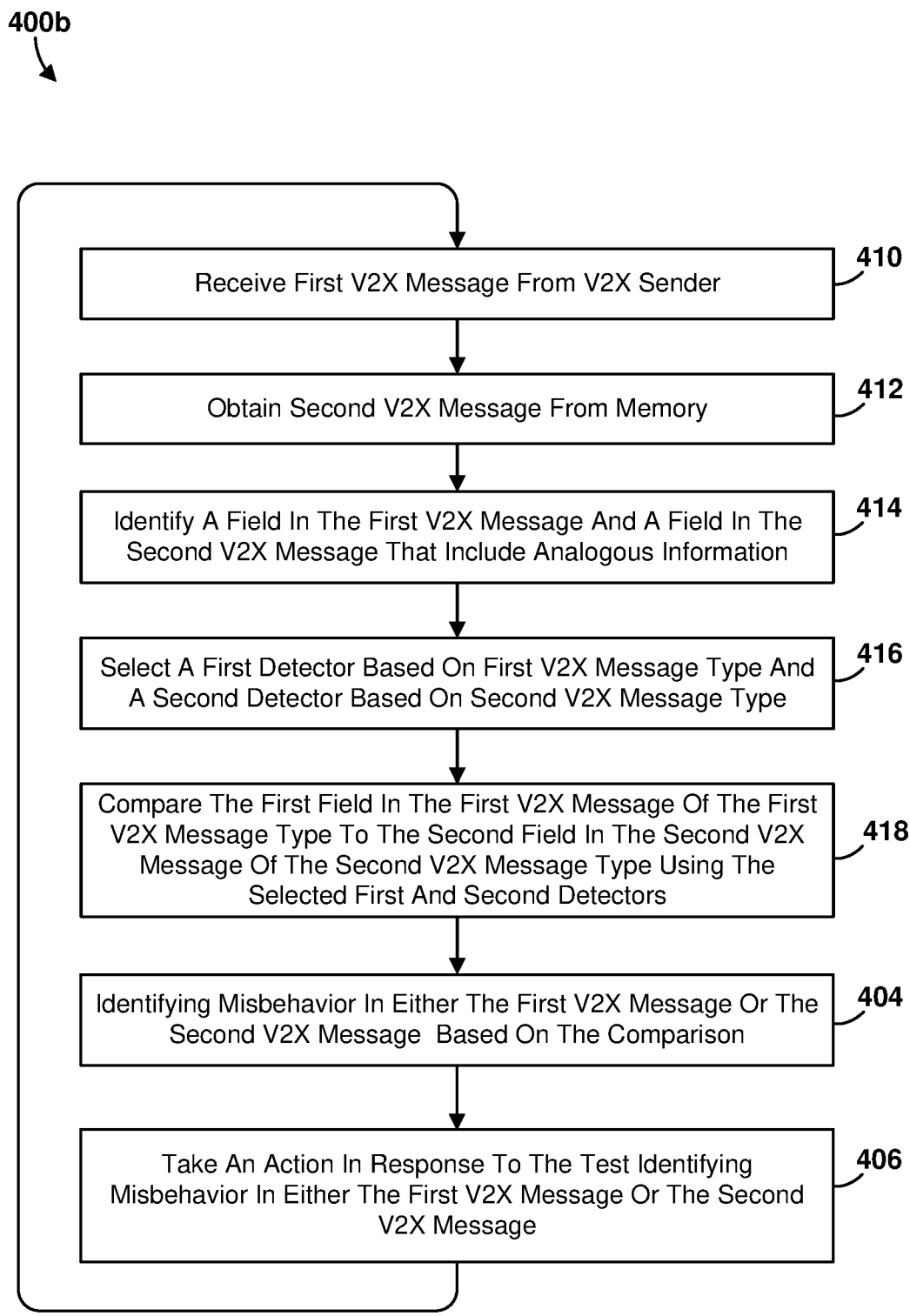
FIGS. 4B and 4C are process flow diagrams of example operations and that may be performed by a processor of a vehicle V2X processing system as part of the method for misbehavior detection in a V2X message in accordance with various embodiments.
Figure 4C:
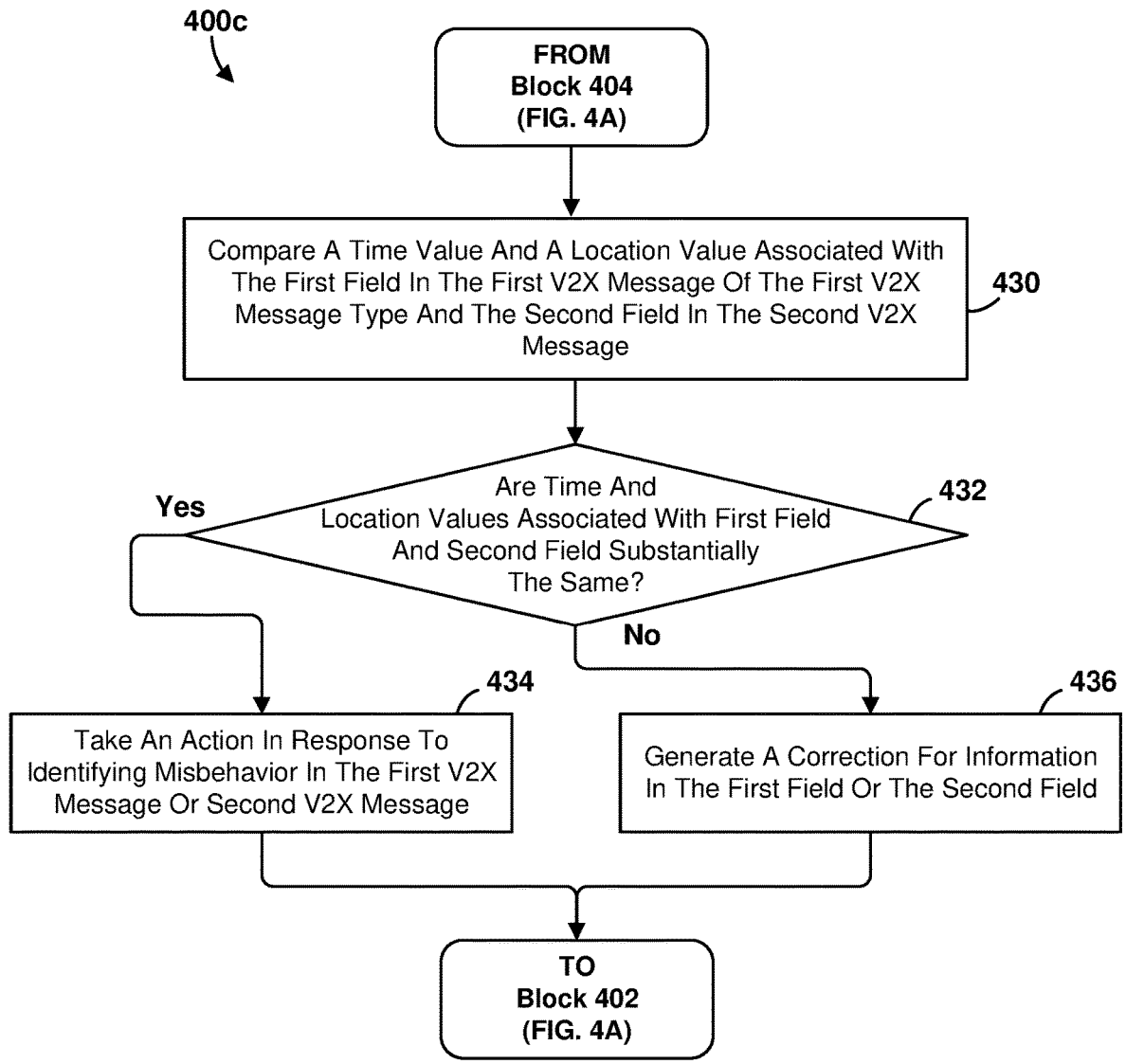

FIGS. 4B and 4C are process flow diagrams of example operations 400b and 400c that may be performed by a processor of a vehicle V2X processing system as part of the method 400a for misbehavior detection in a V2X message in accordance with various embodiments. With reference to FIGS. 1A-4C, the operations 400b and 400c may be performed by a processor (e.g., 205, 300) of a V2X processing system or other vehicle processor (e.g., 104, 205, 220, 300) that may be implemented in hardware elements, software elements, or a combination of hardware and software elements.

Referring to FIG. 4B, the V2X processing system may receive first V2X message from a V2X sender in block 410. For example, the V2X processing system may receive a V2X message from another vehicle 12, 14, 16. Means for performing the operations of block 406 may include a processor (e.g., 205, 303, 304, 306, 307, 308, 310) executing the V2X method reception module 334 and the TX/RX module 344, and the radio module 218.

In block 412, the V2X processing system may obtain a second V2X message from memory (e.g., memory 206). In some embodiments, the V2X processing system may be configured with a storage manager function, which may be implemented in hardware, software, or any combination of hardware and software. The storage manager may store received V2X messages in the memory and may obtain second V2X message(s) for comparison to the first V2X message. In some embodiments, the storage manager may store each V2X message with associated security data of the V2X message, such as a digital signature associated with each V2X message. Storing the security data with the V2X messages may enable the V2X processing device, or another device such as a Misbehavior Authority computing device, to verify the signature of each message in a misbehavior report, enabling the authentication of the V2X messages. The storage manager also may be configured to delete V2X messages based on a storage policy or retention policy. For example, V2X messages from a particular V2X sender that are older than a threshold age may be deleted (for example, the sending vehicle may have left the receiving vehicle's communication range). As another example, an MCM may be deleted once a maneuver associated with the MCM has been completed. As another example, a certain number of V2X messages may be stored, such as ten consecutive BSMs to enable a determination of information consistency, and superfluous V2X messages may be deleted.

In some embodiments, the V2X processing system may determine, or may be configured to select, the second V2X message based on the message type of the first V2X message. For example, the V2X processing system may be configured with a data structure such as a lookup table or another suitable data structure that indicates one or more types of second V2X messages that may include information that is analogous to information in the message type of the first V2X message. As another example, the V2X processing system may be configured with a data structure such as a lookup table or another suitable data structure that indicates one or more types of second V2X messages that may include information that, while not analogous to information in the message type of the first V2X message, may be useful in confirming information in the first V2X message or otherwise identifying misbehaviors in the first V2X message. As another example, the V2X processing system may select the second V2X message based on the first field in the first V2X message and a second field in the second V2X message that have a type of information that is same, similar, or analogous. As another example, V2X processing system may select the second V2X message based on whether information the first V2X message and the second V2X message is used or will be used in a vehicle operation (e.g., a proposed maneuver, a request for maneuver received from another vehicle, a safety determination, or another suitable vehicle operation). Means for performing the operations of block 412 may include a processor (e.g., 205, 303, 304, 306, 307, 308, 310) executing the detector selection module 336.

In block 414, the V2X processing system may identify a field in the first V2X message and a field in the second V2X message that include analogous information. Such analogous information may include, for example, maneuver-related information, dimension information, position information, speed information, acceleration information, vehicle heading information, free space information, and other suitable information that the V2X processing system may compare to determine or detect an inconsistency between or among the information. Means for performing the operations of block 414 may include a processor (e.g., 205, 303, 304, 306, 307, 308, 310) executing the detector selection module 336.

In block 416, the V2X processing system may select a first detector based on the first V2X message type and a second detector based on the second V2X message. For example, the V2X processing system may select the first and second detectors based on the message types of the first and second V2X messages. In some embodiments, the V2X processing system may select the first and second detectors based on the identified first and second fields in the first and second V2X messages. In some embodiments, the V2X processing system may select the first and second detectors based on a type or types of information in the identified first and second fields in the first and second V2X messages. Means for performing the operations of block 416 may include a processor (e.g., 205, 303, 304, 306, 307, 308, 310) executing the detector selection module 336.

In block 418, the V2X processing system may compare the first field in the first V2X message of the first V2X message type to the second field in the second V2X message of the second V2X message type using the selected first and second detectors. In some embodiments, the V2X processing system may compare a result of applying the first detector to information in the first V2X message to a result of applying the second detector to information in the second V2X message. For example, the V2X processing system may apply a CAM vehicle dimension detector to a V2X message (a CAM type message) from a first vehicle, and the CAM vehicle dimension detector may determine dimensions (e.g., a length and a width) of the first vehicle. The V2X processing system also may apply an MCM vehicle dimension detector to a second V2X message (an MCM type message) from a second vehicle. The MCM vehicle dimension detector may determine that the MCM reports dimensions of the first vehicle—and the first vehicle dimensions reported in the MCM message may be different than the first vehicle dimensions reported in the CAM message. While each of the CAM vehicle dimension detector and the MCM vehicle dimension detector acting separately may not detect misbehavior in the first V2X message or the second V2X message, the V2X processing system may detect an inconsistency between the first vehicle dimensions reported in the CAM message and the different first vehicle dimensions reported in the MCM message. Means for performing the operations of block 418 may include a processor (e.g., 205, 303, 304, 306, 307, 308, 310) executing the comparison module 338.

The V2X processor may identify misbehavior in either the first V2X message or the second V2X message based on the comparison in block 404 and may take an action in response to identifying misbehavior in the first V2X message or the second V2X message in block 406 as described.

The V2X processing system may repeat the operations of blocks 410-418, 404, and 406 from time to time, such as periodically or in response to receiving one or more V2X messages.

Referring to FIG. 4C, after the V2X processing system identifies misbehavior in either the first or second V2X messages based on the comparison of the first field in the first V2X message and the second field in the second V2X message in block 404 as described, the V2X processing system may compare a time value and a location value associated with the first field in the first V2X message of the first V2X message type and the second field in the second V2X message in block 430. Means for performing the operations of block 430 may include a processor (e.g., 205, 303, 304, 306, 307, 308, 310) executing the comparison module 338.

In determination block 432, the processor may determine whether the time and location values associated with the first field and the second field are substantially the same. In some embodiments, a permissible difference in location may be limited to a relatively short distance, such as a meter or a few meters. In some embodiments, a permissible difference in time may be limited to a relative short time, such as a small number of milliseconds (ms). Means for performing the operations of determination block 432 may include a processor (e.g., 205, 303, 304, 306, 307, 308, 310) executing the comparison module 338.

In response to determining that the time and location values associated with the first field and the second field are substantially the same (i.e., determination block 432="Yes"), the V2X processing system may take an action in response to identifying misbehavior in the first V2X message or the second V2X message in block 432. For example, the V2X processing system may transmit a misbehavior report indicating the identified misbehavior to a network computing device. Means for performing the operations of block 434 may include a processor (e.g., 205, 303, 304, 306, 307, 308, 310) executing the misbehavior report module 342 and the TX/RX module 344, and the radio module 218.

In response to determining that the time and location values associated with the first field and the second field are not substantially the same (i.e., determination block 432="No"), the V2X processing system may generate a correction for information in the first field or the second field. For example, the first V2X message (e.g., an MCM) may indicate that the vehicle intends to change lanes, and the second V2X message (e.g., a CPM) may indicate that the target lane is occupied (e.g., by applying an MCM free space detector and/or a CPM free space detector). The V2X processing system also may determine that locations associated with the first V2X message and the second V2X message are the same, but that the second V2X message (the CPM) is older than the first V2X message (the MCM). The V2X processing system may generate a correction for the outdated information in the second V2X message. In some embodiments, the V2X processing system may provide the correction to a V2X application executing in the V2X processing system. Means for performing the operations of block 436 may include a processor (e.g., 205, 303, 304, 306, 307, 308, 310) executing the misbehavior detection module 340 and the misbehavior report module 342.

After performing the operations of blocks 434 or 436, the V2X processing system may compare a first field in a first V2X message of a first V2X message type to a second field in a second V2X message of a second V2X message type in block 402 as described.

Figure 5:
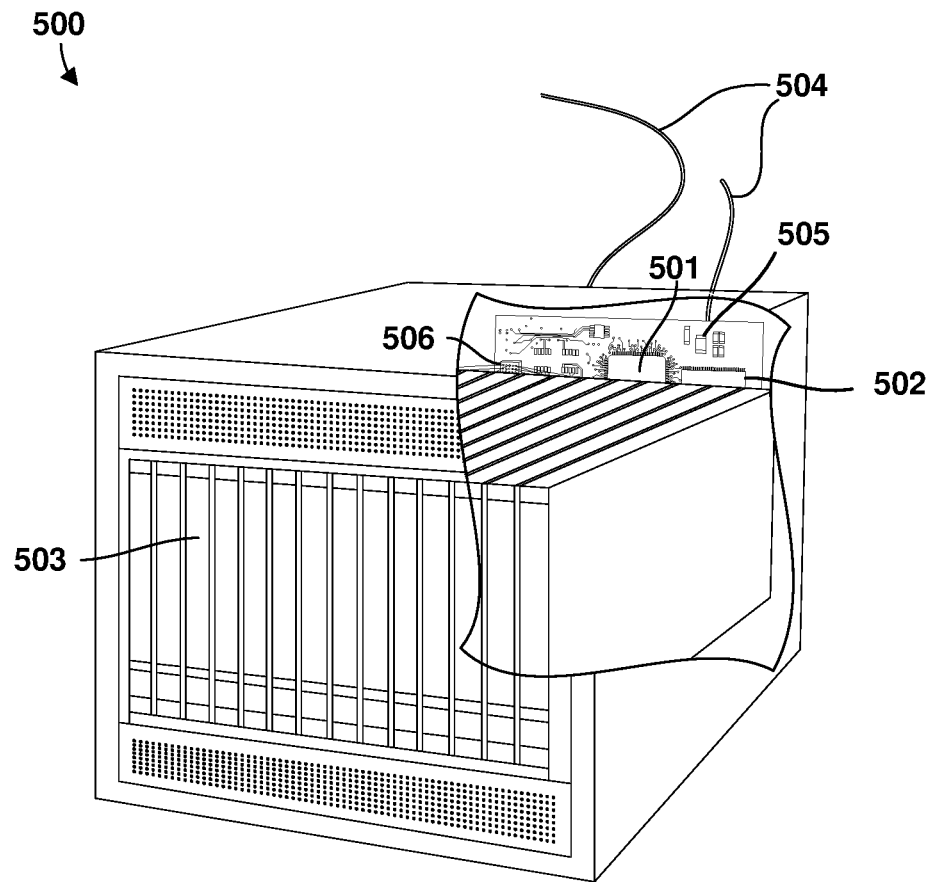
FIG. 5 is a component block diagram of a computing device suitable for use with various embodiments.

FIG. 5 is a component block diagram of a network computing device 500 suitable for use with various embodiments. With reference to FIGS. 1A-5, various embodiments (including, but not limited to, embodiments described with reference to FIGS. 1A-4C) may be implemented on a variety of computing devices, an example of which is illustrated in FIG. 5 in the form of a server device. A network computing device 500 may include a processor 501 coupled to volatile memory 502 and a large capacity nonvolatile memory, such as a disk drive 503. The network computing device 500 may also include a peripheral memory access device such as a floppy disc drive, compact disc (CD) or digital video disc (DVD) drive 506 coupled to the processor 501. The network computing device 500 may also include network access ports 504 (or interfaces) coupled to the processor 501 for establishing data connections with a network, such as the Internet and/or a local area network coupled to other system computers and servers. The network computing device 500 may include one or more transceivers 505 for sending and receiving electromagnetic radiation that may be connected to a wireless communication link. The network computing device 500 may include additional access ports, such as USB, Firewire, Thunderbolt, and the like for coupling to peripherals, external memory, or other devices.

Implementation examples are described in the following paragraphs. While some of the following implementation examples are described in terms of example methods, further example implementations may include: the example methods discussed in the following paragraphs implemented by a V2X processing system that may be an on-board unit, mobile device unit, or mobile computing unit, or a processing system of a network computing device, including a processor configured with processor-executable instructions to perform operations of the methods of the following implementation examples; the example methods discussed in the following paragraphs implemented by a V2X processing system including means for performing functions of the methods of the following implementation examples; and the example methods discussed in the following paragraphs may be implemented as a non-transitory processor-readable storage medium having stored thereon processor-executable instructions configured to cause a processor of a V2X processing system to perform the operations of the methods of the following implementation examples.

Example 1. A method performed by a vehicle-to-everything (V2X) processing system of a vehicle for misbehavior detection in a V2X message, including comparing a first field in a first V2X message of a first V2X message type to a second field in a second V2X message of a second V2X message type, in which the second V2X message type is different from the first V2X message type, identifying misbehavior in either the first V2X message or the second V2X message based on the comparison, and taking an action in response to identifying misbehavior in the first V2X message or the second V2X message.

Example 2. The method of example 1, further including selecting the first field in the first V2X message and the second field in the second V2X message by identifying a field in the first V2X message and a field in the second V2X message that include analogous information.

Example 3. The method of either of examples 1 and 2, in which identifying misbehavior in either the first message or the second V2X message based on the comparison includes identifying misbehavior in either the first V2X message or the second V2X message when information in the first field is inconsistent with information in the second field.

Example 4. The method of any of examples 1-3, in which comparing the first field in the first V2X message of the first V2X message type to the second field in the second V2X message of the second V2X message type includes selecting a first detector based on the first V2X message type and a second detector based on the second V2X message type, and comparing the first field in the first V2X message of the first V2X message type to the second field in the second V2X message of the second V2X message type using the selected first and second detectors.

Example 5. The method of example 4, in which comparing the first field in the first V2X message of the first V2X message type to the second field in the second V2X message of the second V2X message type using the selected first and second detectors includes comparing a result of applying the first detector to information in the first V2X message to a result of applying the second detector to information in the second V2X message.

Example 6. The method of any of examples 1-5, further including comparing a time value and a location value associated with the first field in the first V2X message of the first V2X message type and the second field in the second V2X message, in which taking an action in response to identifying misbehavior in the first V2X message or the second V2X message includes taking an action in response to identifying misbehavior in the first V2X message or the second V2X message when time and location values associated with the first field in the first V2X message of the first V2X message type and the second field in the second V2X message are substantially the same.

Example 7. The method of example 6, in which taking an action in response to identifying misbehavior in the first V2X message or the second V2X message includes generating a correction for information in the first field or the second field when one of the time and location values associated with the first field in the first V2X message of the first V2X message type and the second field in the second V2X message are not substantially the same.

Example 8. The method of any of examples 1-7, in which taking an action in response to identifying misbehavior in either the first V2X message or the second V2X message includes transmitting a misbehavior report indicating the identified misbehavior to a network computing device.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment. For example, one or more of the operations of the methods may be substituted for or combined with one or more operations of the methods.

The foregoing method descriptions and the process flow diagrams are provided merely as illustrative examples and are not intended to require or imply that the operations of various embodiments must be performed in the order presented. As will be appreciated by one of skill in the art the order of operations in the foregoing embodiments may be performed in any order. Words such as "thereafter," "then," "next," etc. are not intended to limit the order of the operations; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the claims.

The hardware used to implement the various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more embodiments, the functions described may be implemented in hardware, software, firmware, or any combination thereof. If implemented in software, the functions may be stored as one or more instructions or code on a non-transitory computer-readable medium or non-transitory processor-readable medium. The operations of a method or algorithm disclosed herein may be embodied in a processor-executable software module, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the scope of the claims. Thus, the present disclosure is not intended to be limited to the embodiments shown herein but is to be accorded the widest scope consistent with the following claims and the principles and novel features disclosed herein.

What is claimed is:

1. A method performed by a vehicle-to-everything (V2X) processing system of a vehicle for misbehavior detection in a V2X message, comprising:
  receiving:
    a first V2X message of a first V2X message type; and
    a second V2X message of a second V2X message type, wherein the second V2X message type is different from the first V2X message type;
  comparing a first field in the first V2X message to a second field in the second V2X message;
  identifying in which of the first V2X message and the second V2X message there is misbehavior based on:
    verification of a digital signature of the first V2X message or the second V2X message;
    consistency of the first V2X message or the second V2X message with one or more previously-received V2X messages; or
    any combination thereof; and
  generating digital data related to the misbehavior in response to identifying the misbehavior in the first V2X message or the second V2X message;
  wherein comparing the first field in the first V2X message of the first V2X message type to the second field in the second V2X message of the second V2X message type comprises:
    selecting a first detector based on the first V2X message type and a second detector based on the second V2X message type; and
    comparing the first field in the first V2X message of the first V2X message type to the second field in the second V2X message of the second V2X message type using the selected first and second detectors.

2. The method of claim 1, further comprising selecting the first field in the first V2X message and the second field in the second V2X message by identifying a field in the first V2X message and a field in the second V2X message that include analogous information.

3. The method of claim 1, wherein identifying in which of the first V2X message and the second V2X message there is misbehavior based on the comparison comprises identifying the misbehavior in either the first V2X message or the second V2X message when information in the first field is inconsistent with information in the second field.

4. The method of claim 1, wherein comparing the first field in the first V2X message of the first V2X message type to the second field in the second V2X message of the second V2X message type using the selected first and second detectors comprises comparing a result of applying the first detector to information in the first V2X message to a result of applying the second detector to information in the second V2X message.

5. The method of claim 1, further comprising comparing a time value and a location value associated with the first field in the first V2X message of the first V2X message type and the second field in the second V2X message, wherein generating the digital data related to the misbehavior in response to identifying the misbehavior in the first V2X message or the second V2X message comprises generating the digital data related to the misbehavior in response to identifying the misbehavior in the first or second V2X message when time and location values associated with the first field in the first V2X message of the first V2X message type and the second field in the second V2X message are substantially the same.

6. The method of claim 5, wherein generating the digital data related to the misbehavior in response to identifying the misbehavior in the first V2X message or the second V2X message comprises generating a correction for information in the first field or the second field when one of the time and location values associated with the first field in the first V2X message of the first V2X message type and the second field in the second V2X message are not substantially the same.

7. The method of claim 1, wherein generating the digital data related to the misbehavior in response to identifying the misbehavior in either the first V2X message or the second V2X message comprises generating a misbehavior report indicating the identified misbehavior,
  the method further comprising transmitting the misbehavior report indicating the identified misbehavior to a network computing device.

8. A vehicle-to-everything (V2X) processing system, comprising:
  a processor configured with processor-executable instructions to:
  receive:
    a first V2X message of a first V2X message type; and
    a second V2X message of a second V2X message type, wherein the second V2X message type is different from the first V2X message type;
  compare a first field in the first V2X message to a second field in the second V2X message;
  identify in which of the first V2X message and the second V2X message there is misbehavior based on:
    verification of a digital signature of the first V2X message or the second V2X message;
    consistency of the first V2X message or the second V2X message with one or more previously-received V2X messages; or
    any combination thereof; and
  generate digital data related to the misbehavior in response to identifying the misbehavior in the first V2X message or the second V2X message;
  wherein the processor is further configured with processor-executable instructions to:
    select a first detector based on the first V2X message type and a second detector based on the second V2X message type; and
    compare the first field in the first V2X message of the first V2X message type to the second field in the second V2X message of the second V2X message type using the selected first and second detectors.

9. The V2X processing system of claim 8, wherein the processor is further configured with processor-executable instructions to select the first field in the first V2X message and the second field in the second V2X message by identifying a field in the first V2X message and a field in the second V2X message that include analogous information.

10. The V2X processing system of claim 8, wherein the processor is further configured with processor-executable instructions to identify in which of the first V2X message and the second V2X message there is misbehavior when information in the first field is inconsistent with information in the second field.

11. The V2X processing system of claim 8, wherein the processor is further configured with processor-executable instructions to compare a result of applying the first detector to information in the first V2X message to a result of applying the second detector to information in the second V2X message.

12. The V2X processing system of claim 8, wherein the processor is further configured with processor-executable instructions to:
  compare a time value and a location value associated with the first field in the first V2X message of the first V2X message type and the second field in the second V2X message; and
  generate the digital data related to the misbehavior in response to identifying the misbehavior in the first V2X message or the second V2X message when time and location values associated with the first field in the first V2X message of the first V2X message type and the second field in the second V2X message are substantially the same.

13. The V2X processing system of claim 12, wherein the processor is further configured with processor-executable instructions to generate the digital data related to the misbehavior including a correction for information in the first field or the second field when one of the time and location values associated with the first field in the first V2X message of the first V2X message type and the second field in the second V2X message are not substantially the same.

14. The V2X processing system of claim 8, wherein the processor is further configured with processor-executable instructions to:
  generate the digital data related to the misbehavior including a misbehavior report indicating the identified misbehavior; and
  transmit the misbehavior report indicating the identified misbehavior to a network computing device.

15. A vehicle-to-everything (V2X) processing system of a vehicle, comprising:
  means for receiving:
    a first V2X message of a first V2X message type; and
    a second V2X message of a second V2X message type, wherein the second V2X message type is different from the first V2X message type;
  means for comparing a first field in the first V2X message to a second field in the second V2X message;
  means for identifying in which of the first V2X message and the second V2X message there is misbehavior based on:
    verification of a digital signature of the first V2X message or the second V2X message;
    consistency of the first V2X message or the second V2X message with one or more previously-received V2X messages; or
    any combination thereof; and
  means for generating digital data related to the misbehavior in response to identifying the misbehavior in the first V2X message or the second V2X message;
  wherein means for comparing the first field in the first V2X message of the first V2X message type to the second field in the second V2X message of the second V2X message type comprises:
    means for selecting a first detector based on the first V2X message type and a second detector based on the second V2X message type; and
    means for comparing the first field in the first V2X message of the first V2X message type to the second field in the second V2X message of the second V2X message type using the selected first and second detectors.

16. The V2X processing system of claim 15, further comprising means for selecting the first field in the first V2X message and the second field in the second V2X message by identifying a field in the first V2X message and a field in the second V2X message that include analogous information.

17. The V2X processing system of claim 15, wherein means for identifying in which of the first V2X message and the second V2X message there is misbehavior based on the comparison comprises means for identifying the misbehavior in either the first V2X message or the second V2X message when information in the first field is inconsistent with information in the second field.

18. The V2X processing system of claim 15, wherein means for comparing the first field in the first V2X message of the first V2X message type to the second field in the second V2X message of the second V2X message type using the selected first and second detectors comprises means for comparing a result of applying the first detector to information in the first V2X message to a result of applying the second detector to information in the second V2X message.

19. The V2X processing system of claim 15, further comprising means for comparing a time value and a location value associated with the first field in the first V2X message of the first V2X message type and the second field in the second V2X message,
  wherein means for generating the digital data related to the misbehavior in response to identifying the misbehavior in the first V2X message or the second V2X message comprises means for generating the digital data related to the misbehavior in response to identifying the misbehavior in the first V2X message or the second V2X message when time and location values associated with the first field in the first V2X message of the first V2X message type and the second field in the second V2X message are substantially the same.

20. The V2X processing system of claim 19, wherein means for generating the digital data related to the misbehavior in response to identifying the misbehavior in the first V2X message or the second V2X message comprises means for generating a correction for information in the first field or the second field when one of the time and location values associated with the first field in the first V2X message of the first V2X message type and the second field in the second V2X message are not substantially the same.

21. The V2X processing system of claim 15, wherein means for generating the digital data related to the misbehavior in response to identifying the misbehavior in either the first V2X message or the second V2X message comprises means for generating a misbehavior report indicating the identified misbehavior,
  the V2X processing system further comprising means for transmitting the misbehavior report indicating the identified misbehavior to a network computing device.

22. A non-transitory processor-readable medium having stored thereon processor-executable instructions configured to cause a processor of a vehicle-to-everything (V2X) processing system of a vehicle to perform operations comprising:
  receiving:
    a first V2X message of a first V2X message type; and a second V2X message of a second V2X message type, wherein the second V2X message type is different from the first V2X message type;

comparing a first field in the first V2X message to a second field in the second V2X message;

identifying in which of the first V2X message and the second V2X message there is misbehavior based on:
 verification of a digital signature of the first V2X message or the second V2X message;
 consistency of the first V2X message or the second V2X message with one or more previously-received V2X messages; or
 any combination thereof; and generating digital data related to the misbehavior in response to identifying the misbehavior in the first V2X message or the second V2X message;

wherein the stored processor-executable instructions are further configured to cause the processor of the V2X processing system to perform operations such that comparing the first field in the first V2X message of the first V2X message type to the second field in the second V2X message of the second V2X message type comprises:
 selecting a first detector based on the first V2X message type and a second detector based on the second V2X message type; and
 comparing the first field in the first V2X message of the first V2X message type to the second field in the second V2X message of the second V2X message type using the selected first and second detectors.

23. The non-transitory processor-readable medium of claim 22, wherein the stored processor-executable instructions are further configured to cause the processor of the V2X processing system to perform operations further comprising selecting the first field in the first V2X message and the second field in the second V2X message by identifying a field in the first V2X message and a field in the second V2X message that include analogous information.

24. The non-transitory processor-readable medium of claim 22, wherein the stored processor-executable instructions are further configured to cause the processor of the V2X processing system to perform operations such that identifying in which of the first V2X message and the second V2X message there is misbehavior based on the comparison comprises identifying the misbehavior in either the first V2X message or the second V2X message when information in the first field is inconsistent with information in the second field.

25. The non-transitory processor-readable medium of claim 22, wherein the stored processor-executable instructions are further configured to cause the processor of the V2X processing system to perform operations such that comparing the first field in the first V2X message of the first V2X message type to the second field in the second V2X message of the second V2X message type using the selected first and second detectors comprises comparing a result of applying the first detector to information in the first V2X message to a result of applying the second detector to information in the second V2X message.

26. The non-transitory processor-readable medium of claim 22, wherein the stored processor-executable instructions are further configured to cause the processor of the V2X processing system to perform operations further comprising comparing a time value and a location value associated with the first field in the first V2X message of the first V2X message type and the second field in the second V2X message,
 wherein generating the digital data related to the misbehavior in response to identifying the misbehavior in the first V2X message or the second V2X message comprises generating the digital data related to the misbehavior in response to identifying the misbehavior in the first V2X message or the second V2X message when time and location values associated with the first field in the first V2X message of the first V2X message type and the second field in the second V2X message are substantially the same.

* * * * *